United States Patent
Hayakawa et al.

(10) Patent No.: US 12,451,125 B2
(45) Date of Patent: Oct. 21, 2025

(54) SPEECH RECOGNITION APPARATUS AND METHOD

(71) Applicant: KABUSHIKI KAISHA TOSHIBA, Tokyo (JP)

(72) Inventors: Daichi Hayakawa, Inzai (JP); Takehiko Kagoshima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 647 days.

(21) Appl. No.: 17/652,823

(22) Filed: Feb. 28, 2022

(65) Prior Publication Data
US 2022/0383860 A1 Dec. 1, 2022

(30) Foreign Application Priority Data
May 31, 2021 (JP) .................. 2021-091236

(51) Int. Cl.
*G10L 15/18* (2013.01)
*G10L 15/06* (2013.01)
*G10L 15/20* (2006.01)

(52) U.S. Cl.
CPC ............ *G10L 15/18* (2013.01); *G10L 15/063* (2013.01); *G10L 15/20* (2013.01)

(58) Field of Classification Search
CPC ....... G10L 15/18; G10L 15/063; G10L 15/20; G10L 15/16; G10L 21/0316;
(Continued)

(56) References Cited

U.S. PATENT DOCUMENTS

| | | | | |
|---|---|---|---|---|
| 5,606,644 | A | * | 2/1997 | Chou .................. G10L 15/063 704/243 |
| 7,761,296 | B1 | * | 7/2010 | Bakis .................... G10L 13/02 704/238 |

(Continued)

FOREIGN PATENT DOCUMENTS

| | | |
|---|---|---|
| CN | 102013253 A | 4/2011 |
| CN | 109182197 A | 1/2019 |

(Continued)

OTHER PUBLICATIONS

Fujimura, H., Ding, N., Hayakawa, D., & Kagoshima, T. (2020). Simultaneous Flexible Keyword Detection and Text-dependent Speaker Recognition for Low-resource Devices. In ICPRAM (pp. 297-307). (Year: 2020).*

(Continued)

*Primary Examiner* — Bhavesh M Mehta
*Assistant Examiner* — Philip H Lam
(74) *Attorney, Agent, or Firm* — Oblon, McClelland, Maier & Neustadt, L.L.P.

(57) ABSTRACT

According to one embodiment, a speech recognition apparatus includes processing circuitry. The processing circuitry generates a plurality of augmented speech data, based on input speech data, generates a plurality of acoustic scores, based on the plurality of augmented speech data and an acoustic model, generates a plurality of adjusted acoustic scores by resampling the acoustic scores, generates an integrated acoustic score by integrating the adjusted acoustic scores, generates an integrated lattice, based on the integrated acoustic score, a pronunciation dictionary, and a language model, and searches a speech recognition result with a highest likelihood from the integrated lattice.

12 Claims, 15 Drawing Sheets

(58) Field of Classification Search
CPC ..... G10L 21/043; G10L 15/08; G10L 21/003; G10L 15/26; G10L 2015/081
See application file for complete search history.

(56) References Cited

U.S. PATENT DOCUMENTS

| | | | | |
|---|---|---|---|---|
| 9,966,066 | B1* | 5/2018 | Corfield | G10L 15/142 |
| 10,115,393 | B1* | 10/2018 | Kumar | G10L 15/16 |
| 10,679,621 | B1* | 6/2020 | Sundaram | G10L 15/22 |
| 11,164,592 | B1* | 11/2021 | Wu | G10L 21/034 |
| 2001/0010037 | A1* | 7/2001 | Imai | G10L 25/78 |
| | | | | 704/E21.017 |
| 2003/0004721 | A1* | 1/2003 | Zhou | G10L 15/083 |
| | | | | 704/251 |
| 2006/0293883 | A1* | 12/2006 | Endo | G10L 21/04 |
| | | | | 704/219 |
| 2007/0073540 | A1* | 3/2007 | Hirakawa | G10L 15/22 |
| | | | | 704/E15.04 |
| 2007/0100618 | A1* | 5/2007 | Lee | G10L 15/1822 |
| | | | | 704/238 |
| 2009/0018833 | A1* | 1/2009 | Kozat | G10L 15/32 |
| | | | | 704/E15.018 |
| 2013/0297311 | A1* | 11/2013 | Yamaguchi | G10L 15/08 |
| | | | | 704/250 |
| 2013/0325456 | A1* | 12/2013 | Takagi | G10L 21/04 |
| | | | | 704/210 |
| 2014/0372120 | A1* | 12/2014 | Harsham | G10L 15/08 |
| | | | | 704/251 |
| 2016/0240188 | A1* | 8/2016 | Seto | G10L 15/32 |
| 2017/0025119 | A1* | 1/2017 | Song | G10L 15/197 |
| 2018/0166071 | A1 | 6/2018 | Lee et al. | |
| 2018/0350352 | A1* | 12/2018 | Song | G10L 15/063 |
| 2018/0359580 | A1* | 12/2018 | Aran | H04R 27/00 |
| 2019/0318742 | A1* | 10/2019 | Srivastava | G10L 15/32 |
| 2019/0385628 | A1* | 12/2019 | Nakashika | G10L 17/04 |
| 2020/0066260 | A1* | 2/2020 | Hayakawa | G10L 15/22 |
| 2021/0020175 | A1 | 1/2021 | Shaq et al. | |
| 2021/0135644 | A1* | 5/2021 | Chon | H03G 5/005 |
| 2024/0038213 | A1* | 2/2024 | Kanagawa | G10L 13/047 |

FOREIGN PATENT DOCUMENTS

| | | |
|---|---|---|
| CN | 112185342 A | 1/2021 |
| JP | 9-325798 A | 12/1997 |
| JP | 2004-139049 A | 5/2004 |
| JP | 2005-221678 A | 8/2005 |
| JP | 2007-309979 A | 11/2007 |
| JP | 2019-82865 A | 5/2019 |
| JP | 2020-12928 A | 1/2020 |
| JP | 2012118441 * | 6/2021 |
| WO | WO 2015/075789 A1 | 5/2015 |
| WO | WO 2017/037830 A1 | 3/2017 |

OTHER PUBLICATIONS

Wegmann, S., & Gillick, L. (2010). Why has (reasonably accurate) Automatic Speech Recognition been so hard to achieve ?. arXiv preprint arXiv:1003.0206. (Year: 2010).*

Rybach, D., Riley, M., & Schalkwyk, J. (Dec. 2017). On lattice generation for large vocabulary speech recognition. In 2017 IEEE Automatic Speech Recognition and Understanding Workshop (ASRU) (pp. 228-235). IEEE. (Year: 2017).*

Miranda, J., Neto, J. P., & Black, A. W. (Dec. 2012). Recovery of acronyms, out-of-lattice words and pronunciations from parallel multilingual speech. In 2012 IEEE Spoken Language Technology Workshop (SLT) (pp. 348-353). IEEE. (Year: 2012).*

Akbacak, M., & Hansen, J. H. (May 2006). Spoken proper name retrieval in audio streams for limited-resource languages via lattice based search using hybrid representations. In 2006 IEEE International Conference on Acoustics Speech and Signal Processing Proceedings (vol. 1, pp. I-I). IEEE. (Year: 2006).*

Akbacak, M., & Hansen, J. H. (2009). Spoken proper name retrieval for limited resource languages using multilingual hybrid representations. IEEE transactions on audio, speech, and language processing, 18(6), 1486-1495. (Year: 2009).*

Ko, T., Peddinti, V., Povey, D., & Khudanpur, S. (Sep. 2015). Audio augmentation for speech recognition. In Interspeech (vol. 2015, p. 3586). (Year: 2015).*

Japan Office Action issued May 21, 2024 in Japanese Patent Application No. 2021-151465 (with unedited computer-generated English Translation), 6 pages.

Japanese Decision to Grant issued May 21, 2024 in Japanese Patent Application No. 2021-091236 (with unedited computer-generated English Translation), 5 pages.

Vanis, et al., "Employing Bayesian Networks and Conditional Probability Functions for Determining Dependences in Road Traffic Accidents Data", 2017 Smart City Symposium Prague (SCSP), 2017, 5 pages.

Xu et al., "An Improved Consensus-Like Method For Minimum Bayes Risk Decoding and Lattice Combination", in Proceedings of ICASSP, 2010, 4 Pages.

Qian et al. "Very Deep Convolutional Neural Networks for Robust Speech Recognition", arXiv:1610.00277v1, 2016, 8 Pages.

Rybach et al., "On Lattice Generation for Large Vocabulary Speech Recognition", IEEE Automatic Speech Recognition and Understanding Workshop (ASRU), 2017, 8 Pages.

Le et al., "Word/Sub-Word Lattices Decomposition and Combination for Speech Recognition", IEEE International Conference on Acoustics, Speech and Signal Processing, 2008, 5 Pages.

Moulines et al., "Pitch-Synchronous Waveform Processing Techniques for Text-to-Speech Synthesis Using Diphones", Speech Communication 9 North-Holland, 1990, 15 Pages.

Lahat et al., "A Spectral Autocorrelation Method for Measurement of the Fundamental Frequency of Noise-Corrupted Speech", in IEEE Transactions on Acoustics, Speech, and Signal Processing, vol. ASSP-35, No. 6, Jun. 1987, 10 Pages Werbos, "Backpropagation Through Time: What It Does and How To Do It", Proceedings of the IEEE, vol. 78, No. 10, Oct. 1990, 11 Pages.

Lee et al., "Real-Time Word Confidence Scoring Using Local Posterior Probabilities on Tree Trellis Search", ICASSP, 2004, 4 Pages.

Kastanos et al., "Confidence Estimation for Black Box Automatic Speech Recognition Systems Using Lattice Recurrent Neural Networks", ICASSP, arXiv:1910.11933v2, 2020, 5 Pages.

Maekawa, "Corpus of Spontaneous Japanese: Its Design and Evaluation", In Proceedings ISCA and IEEE Workshop on Spontaneous Speech Processing and Recognition, SSPR, 2003, 6 pages.

Combined Chinese Office Action and Search Report issued Apr. 1, 2025 in Chinese Patent Application No. 202210168336.X (with unedited computer-generated English translation), 21 pages.

* cited by examiner

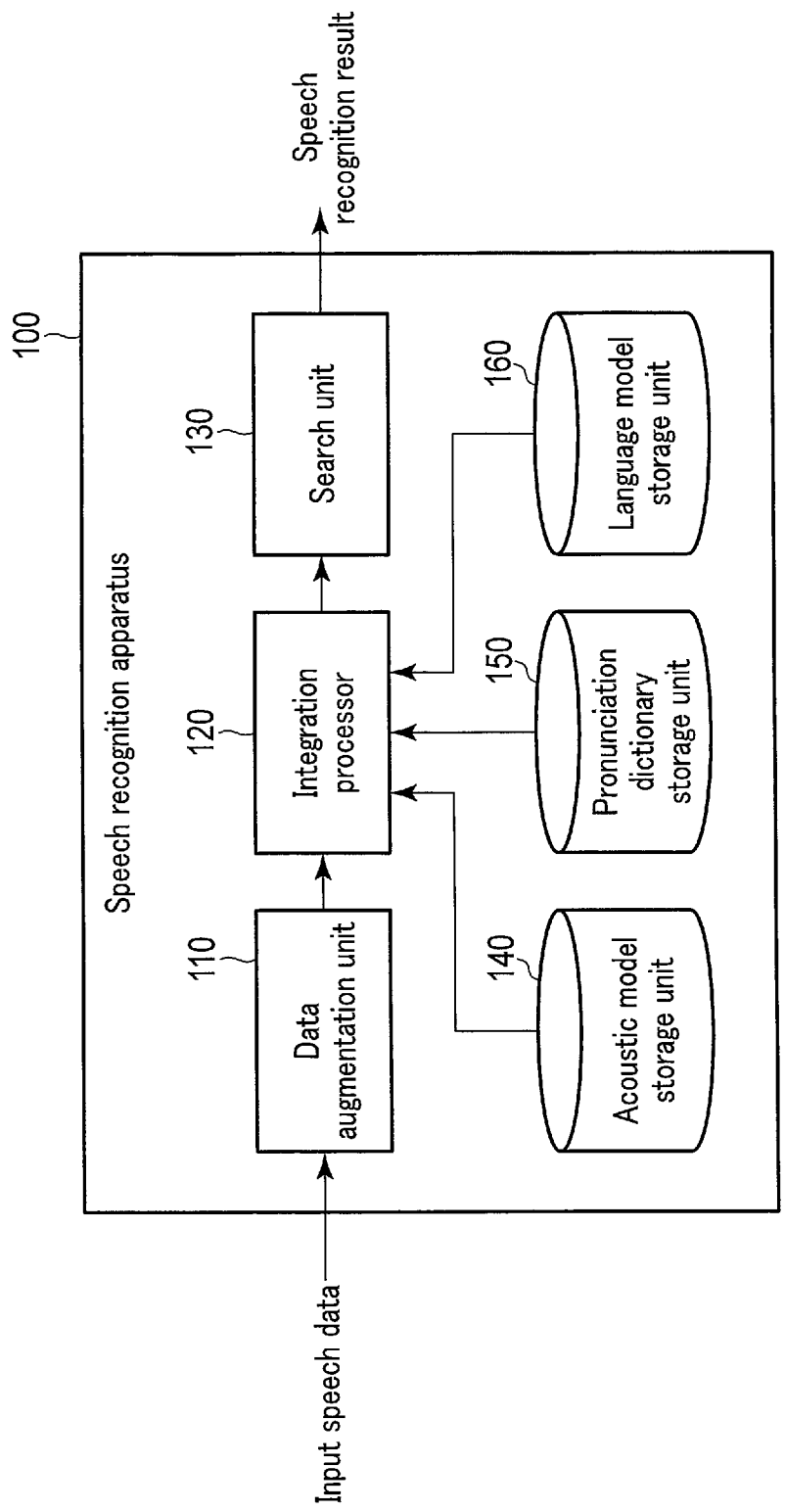
F I G. 1

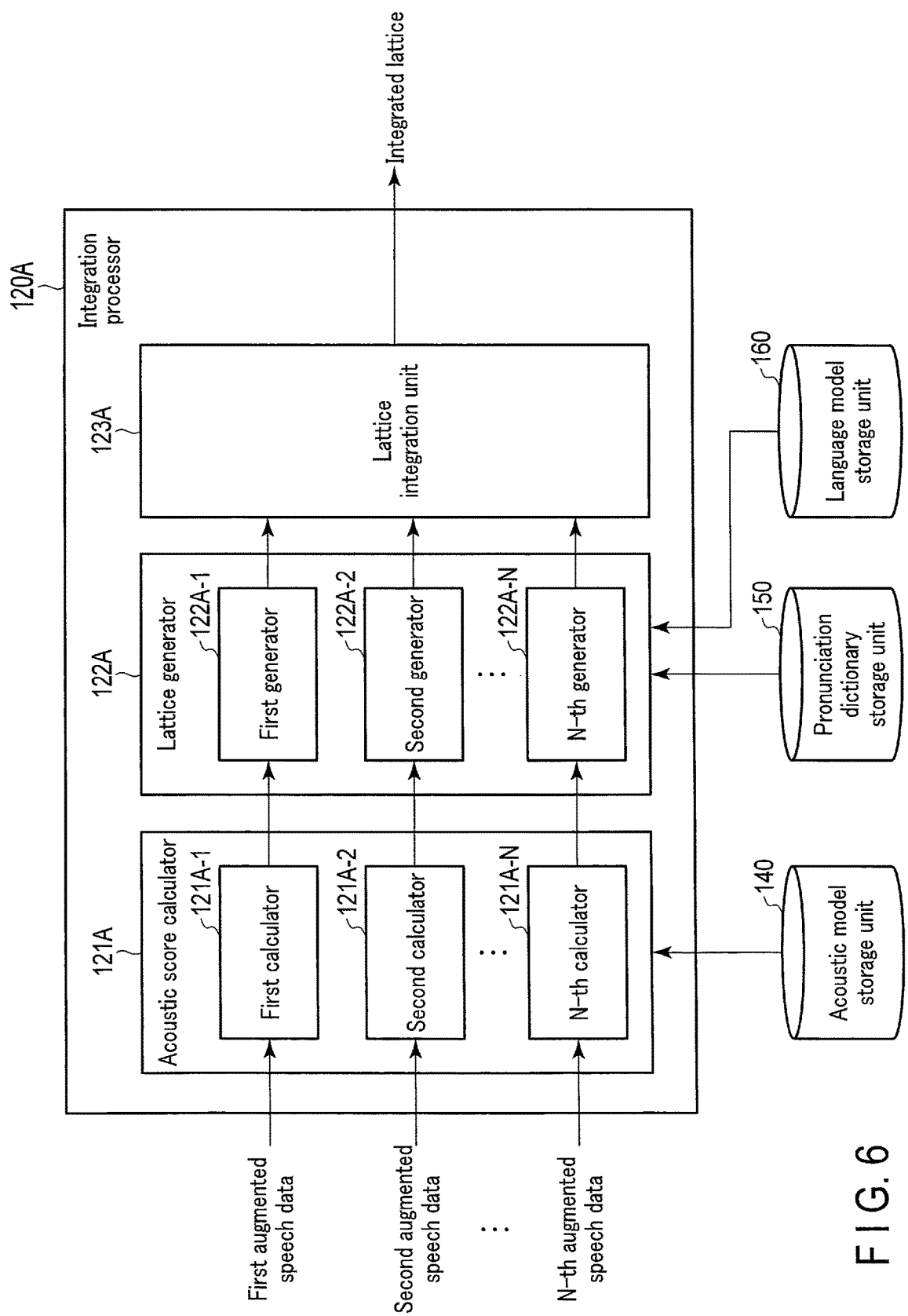
F I G. 6

| | Conventional method | | | Proposed method (lattice integration) | | |
|---|---|---|---|---|---|---|
| | A: Normal speed | B: 0.9x-speed | C: 1.1x-speed | D: A+B | E: A+C | F: A+B+C |
| Evaluation set 1 | 10.12 | 10.45 | 10.36 | 9.95 | 9.99 | 9.88 |
| Evaluation set 2 | 8.20 | 8.34 | 8.17 | 8.05 | 7.98 | 7.93 |
| Evaluation set 3 | 7.87 | 8.21 | 7.99 | 7.76 | 7.77 | 7.70 |

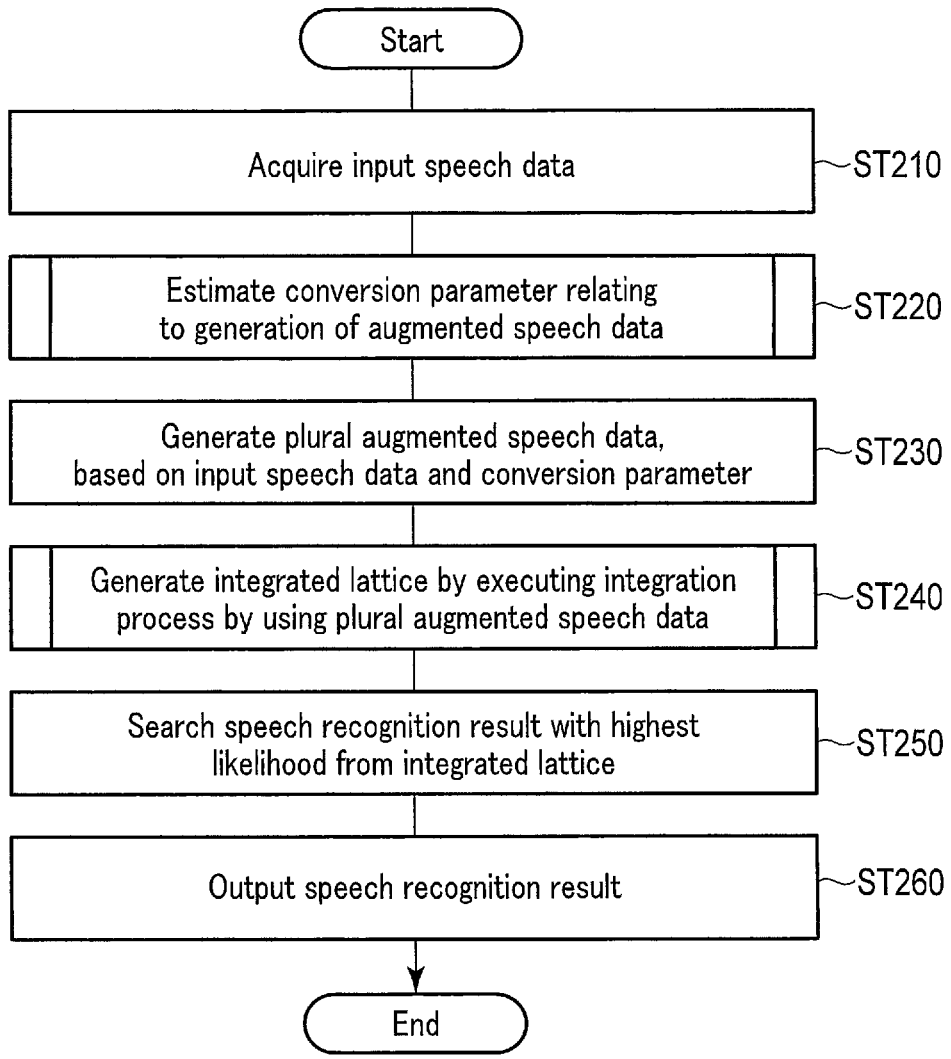
F I G. 11

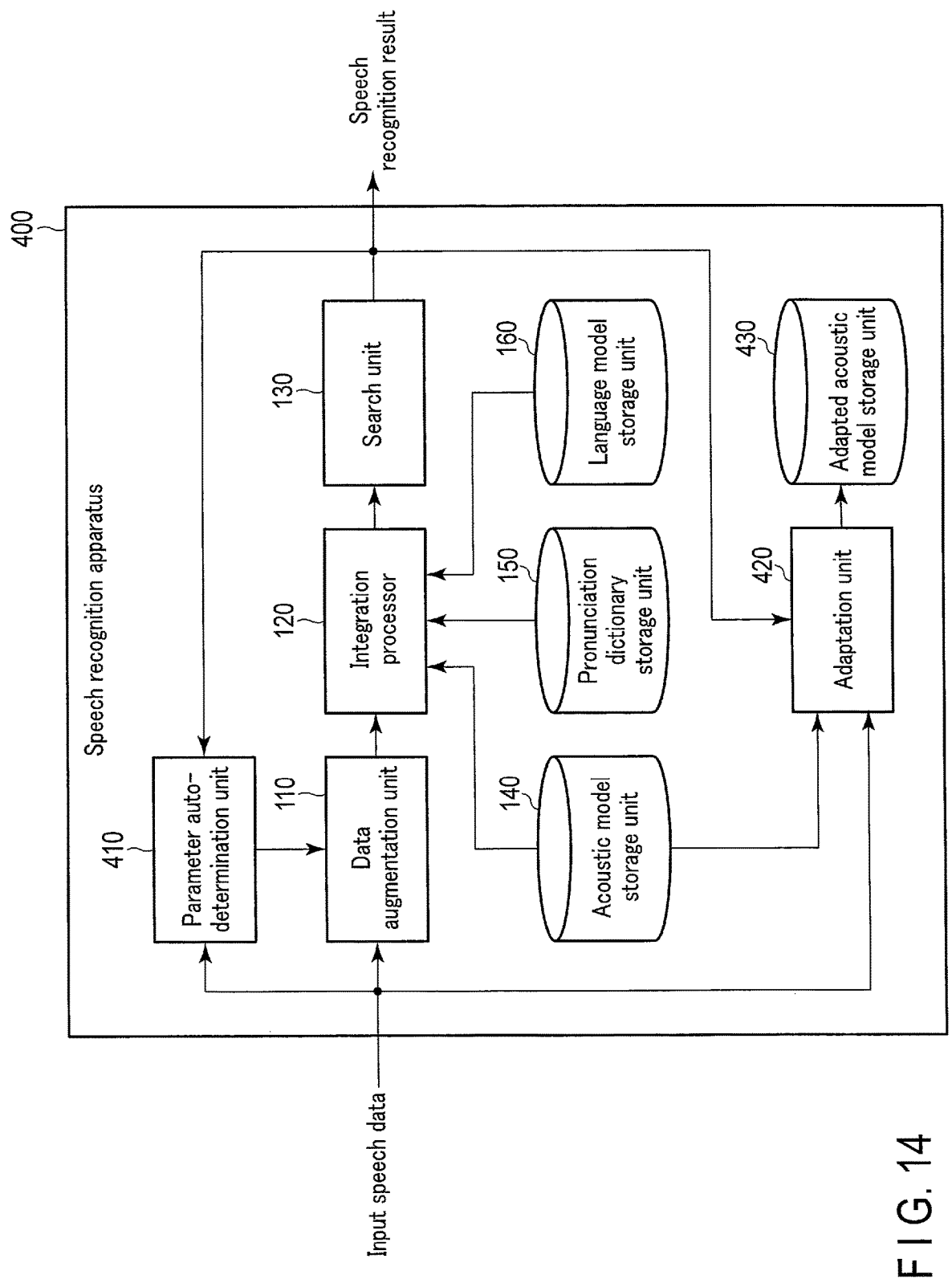
F I G. 14

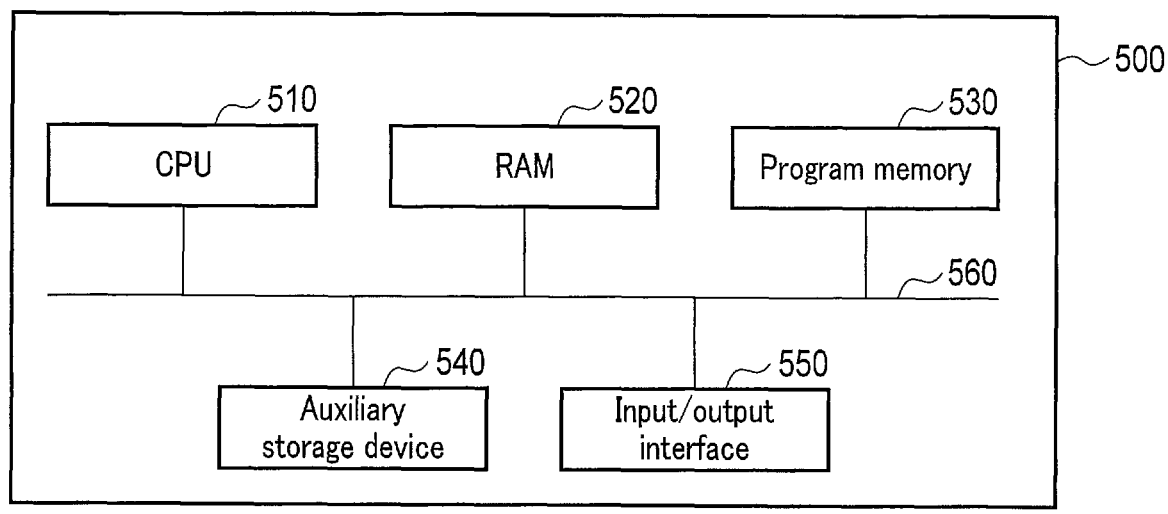
F I G. 15

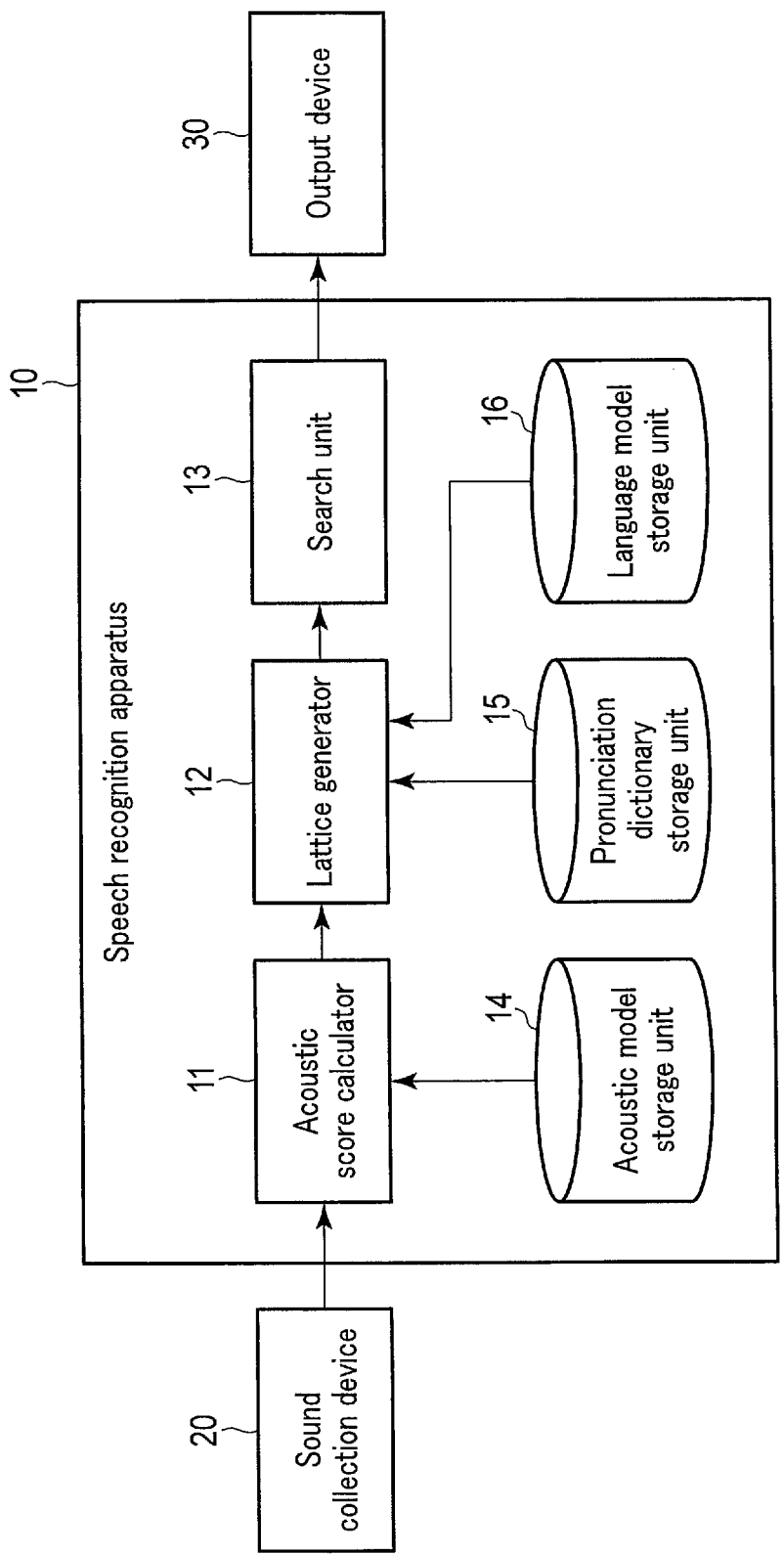
F I G. 16

SPEECH RECOGNITION APPARATUS AND METHOD

CROSS-REFERENCE TO RELATED APPLICATIONS

This application is based upon and claims the benefit of priority from Japanese Patent Application No. 2021-091236, filed May 31, 2021, the entire contents of which are incorporated herein by reference.

FIELD

Embodiments described herein relate generally to a speech recognition apparatus and method.

BACKGROUND

There is known a technology of recognizing spoken speech by using an acoustic model that was trained in advance by a large volume of general speech data. The following four factors are known as factors of a decrease in recognition performance of spoken speech.

(Factor 1) A case in which environment noise is mixed in recorded speech.

(Factor 2) A case in which a speech speed is considerably different from the speech speed of the general speech data. A case in which spoken language that is a recognition target is uttered very fast or very slow.

(Factor 3) A case in which a feature of a speaker is considerably different from the feature of the general speech data. For example, a case in which while the general speech data is composed of utterance of an adult, a recognition target is a spoken language of a child.

(Factor 4) A case in which the amplitude of input speech is considerably different from the amplitude of the general speech data. For example, a case in which the gain of a microphone that collects spoken speech is set to a very low level.

If any one of the above four factors occurs, there arises a problem that the feature of recognition-target speech data that is spoken speech does not match with the feature of the general speech data, and the performance of speech recognition considerably deteriorates.

As one of effective methods for solving the above problem, there is known a method in which input speech is recognized by using a plurality of acoustic models, and the obtained recognition results are integrated. The acoustic models are made to learn speech data of different noises, speech data of different speech speeds, speech data of different features of speakers, and speech data of different amplitudes, respectively, thereby being able to adapt to the four factors. However, a great deal of time and cost is needed to train a plurality of acoustic models. In addition, if speech recognition is executed by a computer by using a plurality of acoustic models, a very large memory capacity is consumed, and there is difficulty in practical use.

As another effective method for solving the above problem, there is known a method in which noise-robust speech recognition is executed by using a single acoustic model. In this method, an input signal including noise and a speech-emphasized signal, in which noise of the input signal is suppressed, are input together to the single acoustic model. In this method, however, (Factor 1) of the four factors can be resolved, but (Factor 2) to (Factor 4) cannot be resolved. In addition, the acoustic model has to be trained after determining in advance the numbers of input signals and speech-emphasized signals, which are input to the acoustic model, and thus constraints are severe.

BRIEF DESCRIPTION OF THE DRAWINGS

FIG. 1 is a block diagram exemplarily illustrating a configuration of a speech recognition apparatus according to a first embodiment.

FIG. 6 is a block diagram exemplarily illustrating a configuration of an integration processor of a speech recognition apparatus according to a modification of the first embodiment.

FIG. 11 is a flowchart exemplarily illustrating an operation of the speech recognition apparatus of FIG. 9.

FIG. 14 is a block diagram exemplarily illustrating a configuration of a speech recognition apparatus according to a fourth embodiment.

FIG. 15 is a block diagram exemplarily illustrating a hardware configuration of a computer according to an embodiment.

FIG. 16 is a block diagram exemplarily illustrating a configuration of a speech recognition system including a conventional speech recognition apparatus.

DETAILED DESCRIPTION

Figure 2:
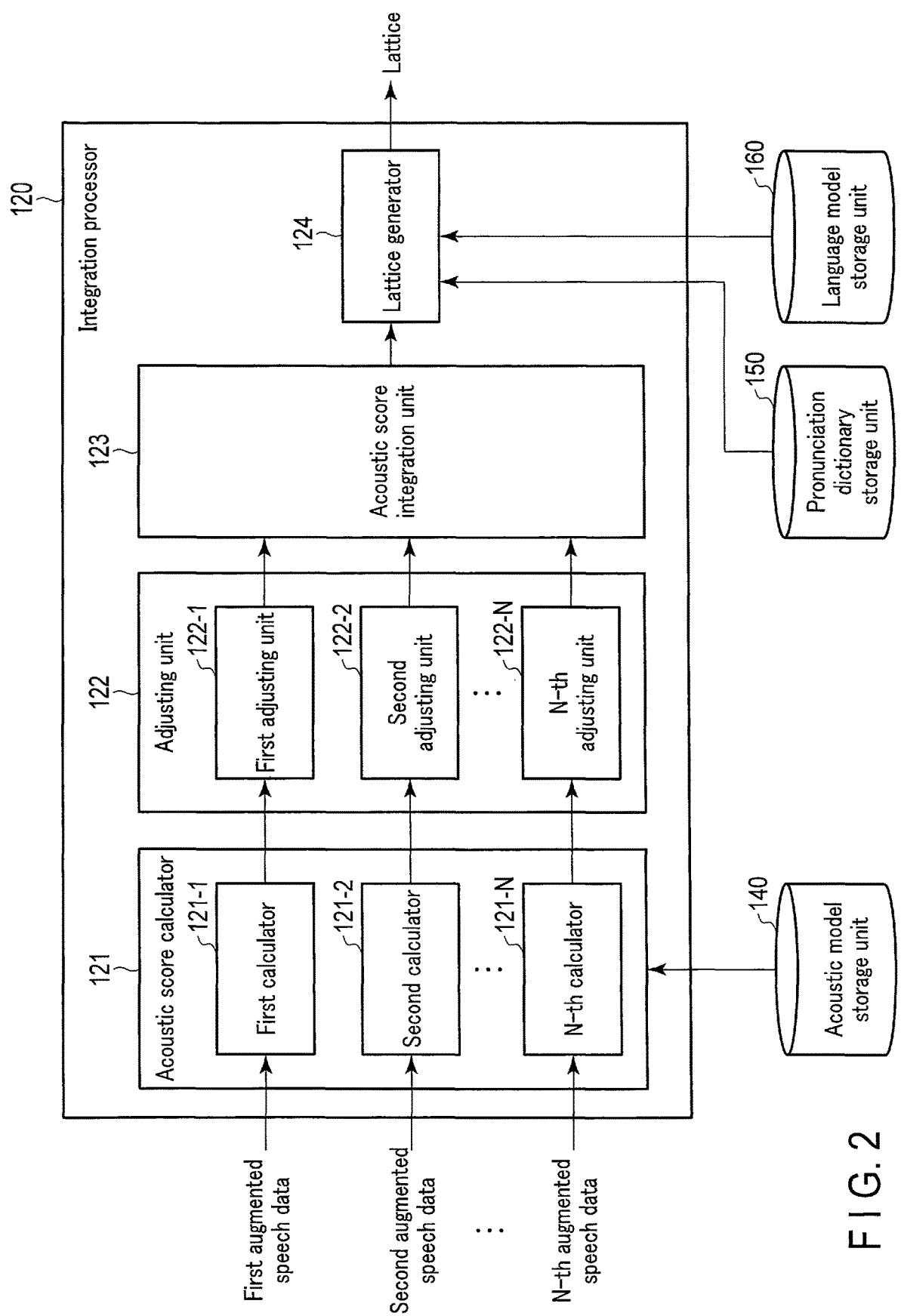
FIG. 2 is a block diagram exemplarily illustrating a configuration of an integration processor of FIG. 1.

In general, according to one embodiment, a speech recognition apparatus includes processing circuitry. The processing circuitry generates a plurality of augmented speech data, based on input speech data, generates a plurality of acoustic scores, based on the plurality of augmented speech data and an acoustic model, generates a plurality of adjusted acoustic scores by resampling the acoustic scores, generates an integrated acoustic score by integrating the adjusted acoustic scores, generates an integrated lattice, based on the integrated acoustic score, a pronunciation dictionary, and a language model, and searches a speech recognition result with a highest likelihood from the integrated lattice.

To begin with, an outline of a conventional speech recognition apparatus will be described.

FIG. 16 is a block diagram exemplarily illustrating a configuration of a speech recognition system including a conventional speech recognition apparatus 10. The speech recognition system includes the speech recognition apparatus 10, a sound collection device 20, and an output device 30.

The sound collection device 20 acquires speech data that is a speech recognition target. The sound collection device 20 is, for example, a microphone. The sound collection device 20 outputs the acquired speech data to the speech recognition apparatus 10. Hereinafter, the speech data acquired by the sound collection device 20 is referred to as input speech data.

The speech recognition apparatus 10 includes an acoustic score calculator 11, a lattice generator 12, a search unit 13, an acoustic model storage unit 14, a pronunciation dictionary storage unit 15, and a language model storage unit 16. Hereinafter, the acoustic model storage unit 14, pronunciation dictionary storage unit 15 and language model storage unit 16 will first be described.

The acoustic model storage unit 14 stores an acoustic model. The acoustic model is, for example, a trained model of machine learning, which was trained in advance by speech data. As the machine learning, for example, DNN (Deep Neural Network) is used. Specifically, the acoustic model is a single model that is trained to output a posterior probability corresponding to an acoustic score by inputting a waveform of speech data in units of, for example, at least one of a phoneme, a syllable, a character, a word-piece, and a word, and the above-described DNN is used. Note that the acoustic model may be a model that is trained by inputting a feature quantity (or a feature vector) extracted from a waveform of speech data, such as a power spectrum or a mel filter bank feature quantity.

The pronunciation dictionary storage unit 15 stores a pronunciation dictionary. The pronunciation dictionary is, for example, a dictionary representing, for example, by what sequence of phonemes (phoneme sequence) a certain word is expressed. The pronunciation dictionary is used in order to obtain a word, based on the acoustic score.

The language model storage unit 16 stores a language model. The language model is a model that describes a rule or a constraint for constituting a sentence from a word sequence. For example, there is known a language model that uses a method of describing a grammar on a rule base, or a statistical method such as N-gram. The language model is used at a time of outputting probabilities of a plurality of candidates of speech sentences in regard to a recognition result composed of a word sequence.

The acoustic score calculator 11 receives the input speech data from the sound collection device 20, and receives the acoustic model from the acoustic model storage unit 14. The acoustic score calculator 11 generates an acoustic score, based on the input speech data and the acoustic model. The acoustic score calculator 11 outputs the generated acoustic score to the lattice generator 12.

Specifically, the acoustic score calculator 11 divides, for example, the waveform data that is the input speech data on a frame-by-frame basis, and generates an acoustic score on a frame-by-frame basis. In addition, the acoustic score calculator 11 may generate an acoustic score by using a feature vector obtained from the waveform data divided on the frame-by-frame basis, as represented by a mel filter bank feature quantity. These matters may be changed as appropriate in accordance with the kind of acoustic model.

In other words, the acoustic score calculator 11 inputs the waveform data divided on the frame-by-frame basis, or the feature vector, to the acoustic model, and generates the acoustic score on the frame-by-frame basis.

The lattice generator 12 receives the acoustic score from the acoustic score calculator 11, receives the pronunciation dictionary from the pronunciation dictionary storage device 15, and receives the language model from the language model storage unit 16. The lattice generator 12 generates a lattice, based on the acoustic score, the pronunciation dictionary and the language model. The lattice generator 12 outputs the generated lattice to the search unit 13.

Specifically, the lattice generator 12 outputs upper-rank candidates of an output word sequence, based on the acoustic score, the pronunciation dictionary and the language model. The upper-rank candidates are output in the form of a lattice in which upper-rank candidates of the output word sequence are nodes, and likelihoods of the words of the upper-rank candidates are edges. In a broader concept, the lattice is formed such that candidate words by speech recognition are nodes, and the likelihoods of the candidate words are edges. Note that the lattice may be called "word lattice".

The search unit 13 receives the lattice from the lattice generator 12. The search unit 13 searches a speed recognition result having a highest likelihood from the lattice. The search unit 13 outputs the speech recognition result to the output device 30.

Note that methods described in, for example, reference document 1 (D. Rybach, J. Schalkwyk, M. Riley, "On Lattice Generation for Large Vocabulary Speech Recognition," IEEE Automatic Speech Recognition and Understanding Workshop (ASRU), 2017), can be used for the generation of the upper-rank candidates of the output word sequence in the lattice generator 12, and for the search of the speech recognition result in the search unit 13.

The output device 30 receives the speech recognition result from the speech recognition apparatus 10. The output device 30 is, for example, a display. The output device 30 converts the speech recognition result into a desired display format, and presents the speech recognition result to the user.

Hereinafter, embodiments of the speech recognition apparatus will be described in detail with reference to the accompanying drawings.

First Embodiment

FIG. 1 is a block diagram exemplarily illustrating a configuration of a speech recognition apparatus 100 according to a first embodiment. The speech recognition apparatus 100 includes a data augmentation unit 110, an integration processor 120, a search unit 130, an acoustic model storage unit 140, a pronunciation dictionary storage unit 150, and a language model storage unit 160. Note that the speech recognition apparatus 100 may include an acquisition unit that acquires input speech data, and an input speech data storage unit that stores the input speech data. In addition, the acoustic model storage unit 140, pronunciation dictionary storage unit 150 and language model storage unit 160 may be integrated in one or more storage units, or may be provided outside the speech recognition apparatus 100 individually or in an integrated manner.

Note that the acoustic model storage unit 140, pronunciation dictionary storage unit 150 and language model storage unit 160 have substantially the same configurations as the acoustic model storage unit 14, pronunciation dictionary storage unit 15 and language model storage unit 16 of FIG. 16, and thus a description thereof is omitted.

The data augmentation unit 110 receives input speech data from a sound collection device (not shown). The data augmentation unit 110 generates a plurality of augmented speech data, based on the input speech data. The data augmentation unit 110 outputs the plural augmented speech data to the integration processor 120.

Specifically, the data augmentation unit 10 generates at least one of a plurality of augmented speech data by executing at least one conversion process of speech speed conversion, sound volume conversion and voice quality conversion on the input speech data. Note that the plural augmented speech data may include the input speech data. Hereinafter, as regards the conversion process, the case of speech speed conversion, the case of sound volume conversion and the case of voice quality conversion will be described separately.

When the conversion process is the speech speed conversion, the data augmentation unit 110 generates the augmented speech data by executing the speech speed conversion that multiplies the speed of the input speech data by a. The condition for the coefficient a is that the coefficient a is a real number that satisfies a >0, and a ≠1, and, hereinafter, the coefficient a is referred to as "speech speed conversion parameter". The speech speed conversion can be implemented, for example, by reproducing speech at a sampling rate that is different from the sampling rate of the input speech data, and converting the speech, which is reproduced at the different sampling rate, to the original sampling rate. The speech speed conversion parameter a may be an arbitrary value that satisfies the above condition, and, in usual cases, for example, 0.9 and 1.1 are used for the speech speed conversion parameter a.

When the conversion process is the sound volume conversion, the data augmentation unit 110 generates augmented speech data by executing sound volume conversion that multiplies the amplitude of the waveform of the input speech data by b. The condition for the coefficient b is that when the input speech data is in a 16-bit format, the coefficient b is a real number that satisfies 0<b<(32767/ maximum value of amplitude of speech data), and, hereinafter, the coefficient b is referred to as "sound volume conversion parameter". The sound volume conversion parameter b may be chosen at random from the above condition.

When the conversion process is the voice quality conversion, the data augmentation unit 110 generates augmented speech data by executing voice quality conversion that multiplies the pitch of the input speech data by c. The condition for the coefficient c is that the coefficient c is a real number that is greater than 0, and, hereinafter, the coefficient c is referred to as "voice quality conversion parameter". The voice quality conversion can be implemented by using, for example, Pitch Synchronous Overlap and. Add (PSOLA).

Note that PSOLA is described, for example, in reference document 2 (E. Moulines, and F. Charpentier, "Pitch synchronous waveform processing techniques for text-to-speech synthesis using diphones," Speech Commn., 9:453-467, 1990.), or the like.

Note that the data augmentation unit 110 may use any one of the speech speed conversion, sound volume conversion and voice quality conversion, which are conversion processes, or may use a combination thereof. In addition, the data augmentation unit 110 may generate plural augmented speech data by setting the speech speed conversion parameter a, sound volume conversion parameter b and voice quality conversion parameter c, which are conversion parameters. The user can freely select the kind of the conversion process, the number of augmented speech data to be generated, and the combination of conversion parameters.

The integration processor 120 receives the plural augmented speech data from the data augmentation unit 110, receives the acoustic model from the acoustic model storage unit 140, receives the pronunciation dictionary from the pronunciation dictionary storage unit 150, and receives the language model from the language model storage unit 160. The integration processor 120 generates an integrated lattice by executing an integration process by using the plural augmented speech data. The integration processor 120 outputs the integrated lattice to the search unit 130. Next, referring to FIG. 2, a more specific configuration of the integration processor 120 will be described.

FIG. 2 is a block diagram exemplarily illustrating a configuration of the integration processor 120 of FIG. 1. The integration processor 120 includes an acoustic score calculator 121, an adjusting unit 122, an acoustic score integration unit 123, and a lattice generator 124.

The acoustic score calculator 121 receives a plurality of augmented speech data from the data augmentation unit 110, and receives the acoustic model from the acoustic model storage unit 140. The acoustic score calculator 121 generates a plurality of acoustic scores, based on each of the augmented speech data and the acoustic model. The acoustic score calculator 121 outputs the generated acoustic scores to the adjusting unit 122. Note that the acoustic score calculator 121 generates the acoustic scores in substantially the same specific manner as the acoustic score calculator 11 of FIG. 16.

The adjusting unit 122 receives the acoustic scores from the acoustic score calculator 121. The adjusting unit 122 generates a plurality of adjusted acoustic scores by resampling the acoustic scores. The adjusting unit 122 outputs the generated adjusted acoustic scores to the acoustic score integration unit 123.

Specifically, the adjusting unit 122 generates the adjusted acoustic scores by resampling the acoustic scores, such that the number of time frames, which are correlated with the acoustic scores, coincides with the number of time frames of the input speech data. Note that the adjusting unit 122 may use, as the number of frames for the coincidence, the input speech data as a reference, or freely selected augmented speech data as a reference.

Note that the acoustic score calculator 121 and the adjusting unit 122 may include a plurality of calculators and a plurality of adjusting units, respectively, in accordance with the number of augmented speech data to be generated. For example, when the number of augmented speech data is N (N>1), the acoustic score calculator 121 includes a first calculator 121-1, a second calculator 121-2, ..., an N-th calculator 121-N, and the adjusting unit 122 includes a first adjusting unit 122-1, a second adjusting unit 122-2, ..., an N-th adjusting unit 122-N. Thus, the acoustic score calculator 121 outputs an N-number of acoustic scores, and the adjusting unit 122 outputs an N-number of adjusted acoustic scores.

The acoustic score integration unit 123 receives the adjusted acoustic scores from the adjusting unit 122. The acoustic score integration unit 123 generates an integrated acoustic score by integrating the adjusted acoustic scores. The acoustic score integration unit 123 outputs the generated integrated acoustic score to the lattice generator 124.

Specifically, the acoustic score integration unit 123 generates the integrated acoustic score by calculating at least one of an average value, a median and a maximum value of the adjusted acoustic scores. Note that the acoustic score integration unit 123 may combine the kinds (average value, median and maximum value) of numerical values to be calculated, or may change the kind of numerical values to be calculated, on a frame-by-frame basis.

The lattice generator 124 receives the integrated acoustic score from the acoustic score integration unit 123, receives the pronunciation dictionary from the pronunciation dictionary storage unit 150, and receives the language model from the language model storage unit 160. The lattice generator 124 generates an integrated lattice, based on the integrated acoustic score, the pronunciation dictionary and the language model. The lattice generator 124 outputs the generated integrated lattice to the search unit 130. Note that the concrete configuration of the lattice generator 124 is substantially the same as the configuration of the lattice generator 12 of FIG. 16.

The search unit 130 receives the integrated lattice from the integration processor 120. The search unit 130 searches a speech recognition result with a highest likelihood from the integrated lattice. The search unit 130 outputs the speech recognition result to an output device (not shown). Note that the concrete configuration of the search unit 130 is substantially the same as the configuration of the search unit 13 of FIG. 16.

The configuration of the speech recognition apparatus 100 according to the first embodiment has been described above. Next, an operation of the speech recognition apparatus 100 will be described with reference to a flowchart of FIG. 3.

Figure 3:
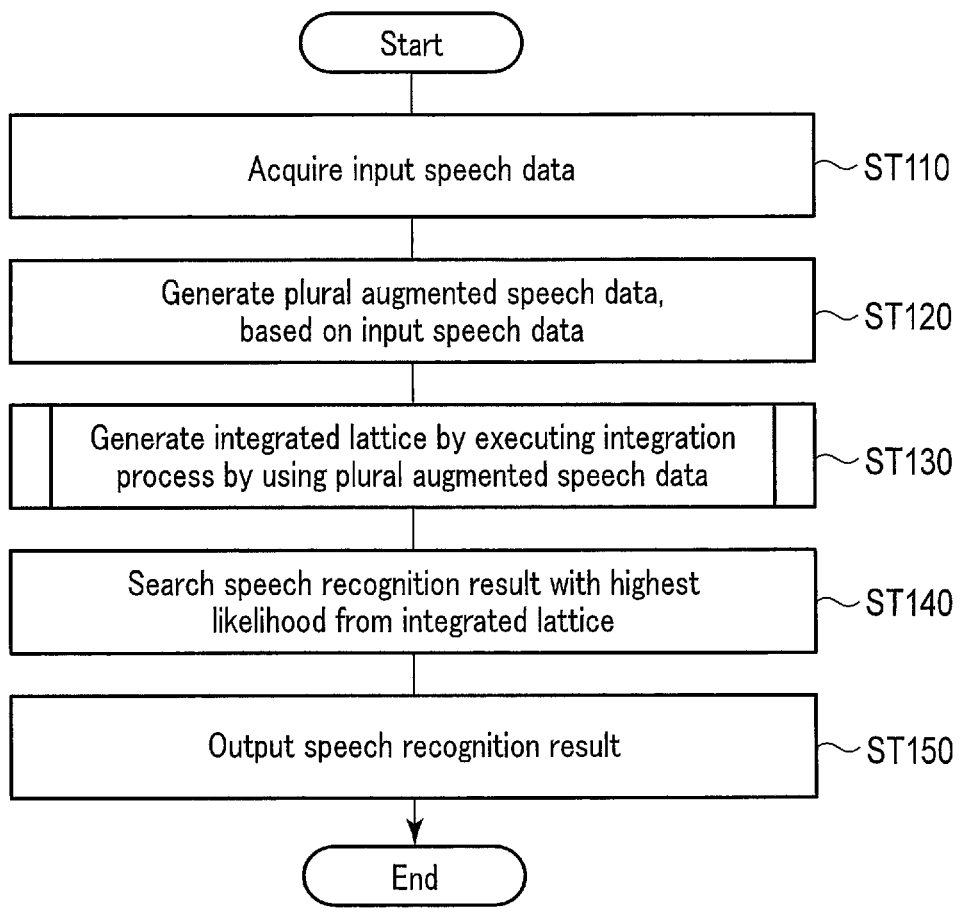
FIG. 3 is a flowchart exemplarily illustrating an operation of the speech recognition apparatus of FIG. 1.

FIG. 3 is a flowchart exemplarily illustrating an operation of the speech recognition apparatus 100 of FIG. The flowchart of FIG. 3 illustrates, for example, a flow of sequential steps of outputting a speech recognition result from a lattice that corresponds to one sentence of input speech data.

(Step ST110)

The speech recognition apparatus 100 acquires input speech data from the sound collection device.

(Step ST120)

After the input speech data is acquired, the data augmentation unit 110 generates a plurality of augmented speech data, based on the input speech data.

(Step ST130)

After the plural augmented speech data are generated, the integration processor 120 generates an integrated lattice by executing the integration process by using the plural augmented speech data. Hereinafter, the process of step ST130 will be referred to as "integration process". A concrete example of the integration process will be described with reference to a flowchart of FIG. 4.

Figure 4:
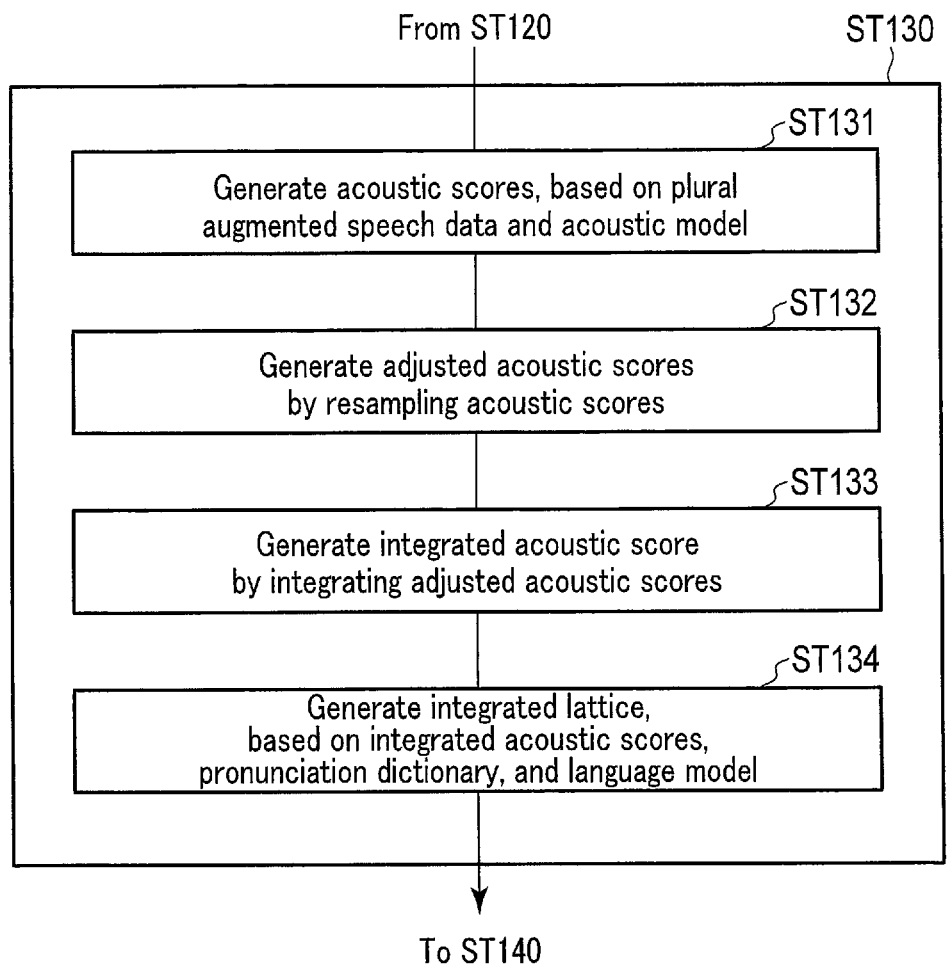
FIG. 4 is a flowchart exemplarily illustrating an integration process of the flowchart of FIG. 3.

FIG. 4 is a flowchart exemplarily illustrating the integration process of the flowchart of FIG. 3. The flowchart of FIG. 4 transitions from step ST120.

(Step ST131)

After the plural augmented speech data are generated, the acoustic score calculator 121 generates a plurality of acoustic scores, based on each of the plural augmented speech data and the acoustic model.

(Step ST132)

After the acoustic scores are generated, the adjusting unit 122 generates a plurality of adjusted acoustic scores by resampling the acoustic scores. Hereinafter, a concrete example of the process of the adjusting unit 122 will be described.

For example, when one integrated acoustic score is generated by integrating a plurality of acoustic scores (hereinafter, also referred to as "N acoustic scores"), it is preferable that the acoustic score integration unit 123 executes the process on a frame-by-frame basis, on the assumption that the numbers of time frames of the N acoustic scores coincide.

However, for example, when the augmented speech data are generated by the speech speed conversion, the time length of the input speech data is different from the time length of the generated augmented speech data, and thus there arises such a problem that the numbers of time frames, which are correlated with the respective acoustic scores, do not coincide. Due to this problem, the acoustic score integration unit 123 cannot execute the process on a frame-by-frame basis. Thus, the above problem is solved by executing, by the adjusting unit 122, the process of making coincident the numbers of time frames, which are correlated with the respective acoustic scores.

It is now assumed that the number of time frames of the input speech data is T, and an index of the time frame is t ($1 \leq t \leq T$). In addition, it is assumed that the number of time frames of N augmented speech data is $T_n$ ($1 \leq n \leq N$). It is assumed that the acoustic score in a t-th frame at a time when n-th augmented speech data is input is $Y_t^n$. This $Y_t^n$ is a vector of K dimensions (K is a natural number).

If the n-th augmented speech data is generated by the speech speed conversion or voice quality conversion, $T_n = T$ is established. However, if the augmented speech data is generated by the speech speed conversion, $T_n \neq T$ is established, and it is thus necessary to convert the acoustic scores of the $T_n$ frames to acoustic scores of T frames.

The above conversion can be executed by the following procedure. To begin with, the adjusting unit 122 extracts a k-th dimension ($1 \leq k \leq K$) from among the acoustic scores $Y_t^n$ from the first frame to the $T_n$-th frame (step 1). Then, the adjusting unit 122 regards the extracted $T_n$ scores as time-sequential data of $T_n$ samples, and creates data obtained by resampling at a sampling rate multiplied by $T/T_n$. Thereby, the adjusting unit 122 can convert $T_n$ scores to T scores (step 2). Further, by repeating the above step 1 and step 2 with respect to $1 \leq k \leq K$, the adjusting unit 122 can convert the acoustic scores $Y_t^n$ of $T_n$ frames to the acoustic scores of T frames. The converted acoustic scores are the above-described adjusted acoustic scores.

Figure 5:
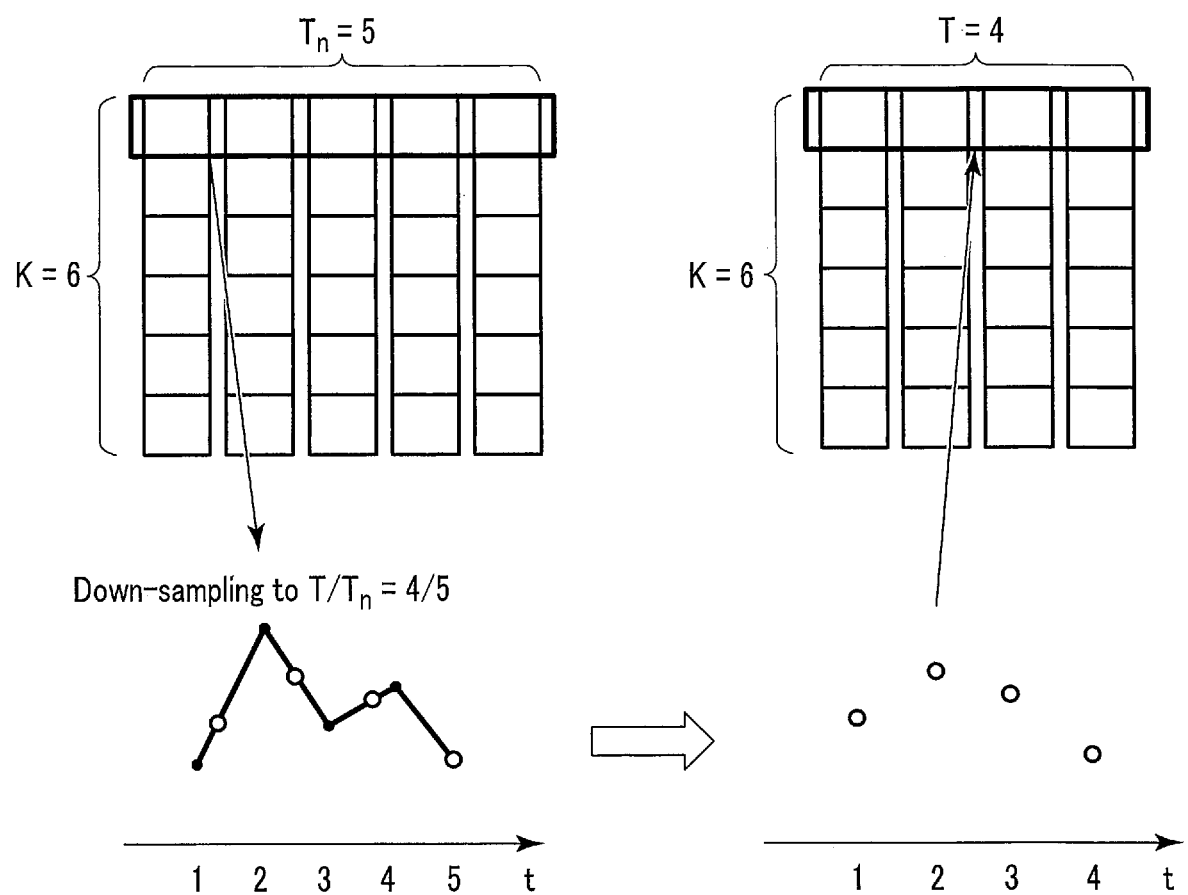
FIG. 5 is a view for describing resampling in an adjusting unit of FIG. 2.

FIG. 5 is a view for describing the resampling in the adjusting unit 122 of FIG. 2. FIG. 5 illustrates down-sampling from $T_n = 5$ to $T = 4$. The adjusting unit 122 extracts, for example, a first dimension from among the acoustic scores from a first frame to a ($T_n = 5$)th frame. Next, the adjusting unit 122 regards the extracted five scores as time-sequential data of five samples, and creates data obtained by down-sampling the time-sequential data at a sampling rate multiplied by 4/5. Thereby, the adjusting unit 122 can convert the five scores to four scores.

(Step ST133)

After the generation of the adjusted acoustic scores, the acoustic score integration unit 123 generates an integrated acoustic score by integrating the adjusted acoustic scores. Hereinafter, a concrete example of the process of the acoustic score integration unit 123 will be described.

The acoustic score integration unit 123 receives the N adjusted acoustic scores that are converted to the acoustic scores of the T frames, and outputs one integrated acoustic score of the T frames. It is assumed that the adjusted acoustic score in the t-th frame at a time when the n-th augmented speech data is input is $Z_t^n$. In addition, it is assumed that the integrated acoustic score is $S_t$. Here, $Z_t^n$ and $S_t$ are vectors of K dimensions, and are expressed by equation (1) and equation (2) below, respectively.

$$Z_t^n = [z_{t,1}^n, z_{t,2}^n, \ldots, z_{t,k}^n, \ldots, z_{t,K}^n]' \tag{1}$$

$$S_t = [S_{t,1}, S_{t,2}, \ldots, S_{t,k}, \ldots, S_{t,K}]' \tag{2}$$

In equation (1) and equation (2), "'" (dash) means transposition. In addition, each element $S_{t,k}$ of the integrated acoustic score $S_T$ can be calculated by any one of the following equation (3) to equation (5).

$$S_{t,k} = \frac{\sum_{n=1}^{N} z_{t,k}^n}{N} \tag{3}$$

$$S_{t,k} = \text{median}(z_{t,k}^n) \tag{4}$$

$$S_{t,k} = \max(z_{t,k}^n) \tag{5}$$

As regards the N adjusted acoustic scores, equation (3) calculates an average value, equation (4) calculates a median, and equation (5) calculates a maximum value. Note that the median ( ) in equation (4) is a function that takes a median with respect to $1 \leq n \leq N$. In addition, the max (·) in equation (5) is a function that takes a maximum value with respect to $1 \leq n \leq N$.

In summary, the acoustic score integration unit 123 can generate one integrated acoustic score by calculating at least one of the average value, median and maximum value of the N adjusted acoustic scores.

(Step ST134)

After the generation of the integrated acoustic score, the lattice generator 124 generates an integrated lattice, based on the integrated acoustic score, the pronunciation dictionary, and the language model. After the process of step ST134, the process transitions to step ST140.

(Step ST140)

After the generation of the integrated lattice, the search unit 130 searches a speech recognition result with a highest likelihood from the integrated lattice.

(Step ST150)

After the speech recognition result is searched, the speech recognition apparatus 100 outputs the speech recognition result to the output device. After step ST150, the process ends.

Note that, as long as the input speech data is continuously acquired, the speech recognition apparatus 100 may continue to output the speech recognition result corresponding to the input speech data, according to the process of the flowchart of FIG. 3.

As described above, the speech recognition apparatus according to the first embodiment generates a plurality of augmented speech data, based on input speech data; generates a plurality of acoustic scores, based on the plurality of augmented speech data and an acoustic model; generates a plurality of adjusted acoustic scores by resampling the acoustic scores; generates an integrated acoustic score by integrating the adjusted acoustic scores; generates an integrated lattice, based on the integrated acoustic score, a pronunciation dictionary, and a language model; and searches a speech recognition result with a highest likelihood from the integrated lattice. Therefore, the speech recognition apparatus according to the first embodiment can improve the speech recognition performance.

The speech recognition apparatus according to the first embodiment can dissolve (Factor 2) to (Factor 4) even when only one acoustic model is present. Hereinafter, concrete examples of solutions to (Factor 2) to (Factor 4) will be described.

As regards (Factor 2), for example, it is assumed that the input speech data includes a part that is fast and disables acquisition of a correct recognition result if this part is input and recognized as such, but a correct recognition result can be acquired if the part is subjected to speech speed conversion at a speed multiplied by 0.9. In this case, data at a speed multiplied by 0.9 is generated by the data augmentation unit, and an integration process is applied to the input speech data and the data at the speed multiplied by 0.9. Thereby, both the best of the recognition result of the input speech data and the best of the recognition result of the data at the speed multiplied by 0.9 can be obtained. As a result, the speech recognition apparatus according to the first embodiment can improve the speech recognition performance.

As regards (Factor 3), for example, it is assumed that the input speech data includes a part of a child's voice that disables acquisition of a correct recognition result if this part is input and recognized as such, but a correct recognition result can be acquired if this part is subjected to voice quality conversion at a pitch multiplied by 0.95. In this case, speech data at a pitch multiplied by 0.95 is generated by the data augmentation unit, and an integration process is applied to the input speech data and the speech data at the pitch multiplied by 0.95. Thereby, both the best of the recognition result of the input speech data and the best of the recognition result of the speech data at the pitch multiplied by 0.95 can be obtained. As a result, the speech recognition apparatus according to the first embodiment can improve the speech recognition performance.

As regards (Factor 4), for example, it is assumed that the gain of a microphone that collects input speech data is small, and the input speech data includes a part that disables acquisition of a correct recognition result if this part is input and recognized as such, but a correct recognition result can be acquired if the amplitude of this part is doubled by sound volume conversion. In this case, speech data with the doubled amplitude is generated by the data augmentation unit, and an integration process is applied to the input speech data and the speech data with the doubled amplitude. Thereby, both the best of the recognition result of the input speech data and the best of the recognition result of the speech data with the doubled amplitude can be obtained. As a result, the speech recognition apparatus according to the first embodiment can improve the speech recognition performance.

(Modification of the First Embodiment)

The speech recognition apparatus according to the first embodiment generates the integrated lattice by integrating the plurality of acoustic scores. On the other hand, a speech recognition apparatus according to a modification of the first embodiment generates a plurality of lattices from a plurality of acoustic scores, and generates an integrated lattice by integrating the lattices.

The speech recognition apparatus according to the modification of the first embodiment includes a data augmentation unit 110, an integration processor 120A, a search unit 130, an acoustic model storage unit 140, a pronunciation dictionary storage unit 150, and a language model storage unit 160.

FIG. 6 is a block diagram exemplarily illustrating a configuration of the integration processor 120A of the speech recognition apparatus according to the modification of the first embodiment. The integration processor 120A includes an acoustic score calculator 121A, a lattice generator 122A, and a lattice integration unit 123A. Note that the acoustic score calculator 121A has substantially the same configuration as the acoustic score calculator 121 of FIG. 2, and thus a description thereof is omitted.

The lattice generator 122A receives a plurality of acoustic scores from the acoustic score calculator 121A, receives the pronunciation dictionary from the pronunciation dictionary storage unit 150, and receives the language model from the language model storage unit 160. The lattice generator 122A generates a plurality of lattices, based on the acoustic scores, the pronunciation dictionary and the language model. Each of the lattices is, for example, a word lattice in which candidate words by speech recognition are nodes, and likelihoods of the candidate words are edges. The lattice generator 122A outputs the generated lattices to the lattice integration unit 123A.

Note that the acoustic score calculator 121A and the lattice generator 122A may include a plurality of calculators and a plurality of generators, respectively, in accordance with the number of augmented speech data to be generated. For example, when the number of augmented speech data is N (N>1), the acoustic score calculator 121A includes a first calculator 121A-1, a second calculator 121A-2, . . . , an N-th calculator 121A-N, and the lattice generator 122A includes a first generator 122A-1, a second generator 122A-2, . . . , an N-th generator 122A-N. Thus, the acoustic score calculator 121A outputs an N-number of acoustic scores, and the lattice generator 122A outputs an N-number of lattices.

The lattice integration unit 123A receives the lattices from the lattice generator 122A. The lattice integration unit 123A generates an integrated lattice by integrating the lattices. The lattice generator 123A outputs the generated integrated lattice to the search unit 130.

Specifically, the lattice integration unit 123A generates the integrated lattice by connecting start points of the lattices and connecting end points of the lattices, and integrating common parts of candidate words. For the integration of the lattices, use can be made of a method described in reference document 3 (V. Le, S. Seng, L. Besacier and B. Bigi, "Word/sub-word lattices decomposition and combination for speech recognition," IEEE International Conference on Acoustics, Speech and Signal Processing, 2008), or the like.

The configuration of the speech recognition apparatus according to the modification of the first embodiment has been described above. Next, an operation relating to the integration processor 120A according to the modification of the present embodiment will be described with reference to a flowchart of FIG. 7. Note that the operation of the speech recognition apparatus according to the modification of the first embodiment is an operation in which the process of step ST130 is replaced with a process of step ST130A.

Figures 7, 8:
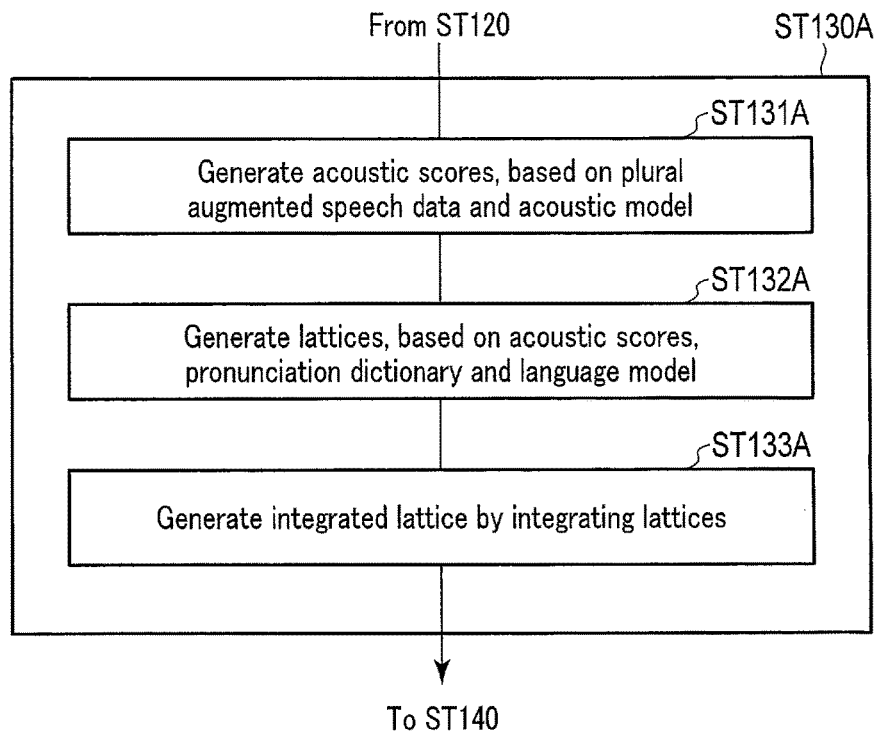
FIG. 7 is a flowchart exemplarily illustrating an integration process in an operation of the speech recognition apparatus according to the modification of the first embodiment.
FIG. 8 is a table exemplarily illustrating an experimental result of the speech recognition apparatus according to the modification of the first embodiment.

FIG. 7 is a flowchart exemplarily illustrating an integration process in the operation of the speech recognition apparatus according to the modification of the first embodiment. The flowchart of FIG. 7 corresponds to the process of step ST130A, and transitions from step ST120.

(Step ST131A)
After the generation of the plural augmented speech data, the acoustic score calculator 121A generates a plurality of acoustic scores, based on the plural augmented speech data and the acoustic model.

(Step ST132A)
After the generation of the acoustic scores, the lattice generator 122A generates a plurality of lattices, based on the acoustic scores, the pronunciation dictionary, and the language model.

(Step ST133A)
After the generation of the lattices, the lattice generation unit 123A generates an integrated lattice by integrating the lattices. After the process of step ST133A, the process transitions to step ST140.

As described above, the speech recognition apparatus according to the modification of the first embodiment generates a plurality of augmented speech data, based on input speech data; generates a plurality of acoustic scores, based on the plurality of augmented speech data and an acoustic model; generates a plurality of lattices, based on the acoustic scores, a pronunciation dictionary, and a language model; generates an integrated lattice by integrating the lattices; and searches a speech recognition result with a highest likelihood from the integrated lattice. Therefore, the speech recognition apparatus according to the modification of the first embodiment can improve the speech recognition performance.

FIG. 8 is a table exemplarily illustrating an experimental result of the speech recognition apparatus according to the modification of the first embodiment. FIG. 8 illustrates a result of comparison between a recognition performance in a conventional method, and a recognition performance at a time when the method of the modification of the first embodiment is applied by generating data by the data augmentation unit by multiplying the speech speed of the input speech data by 0.9, and generating data by the data augmentation unit by multiplying the speech speed of the input speech data by 1.1. The evaluation scale is a word error rate (WER), and a smaller value indicates a higher recognition performance. In addition, the acoustic model, pronunciation dictionary and language model are trained based on the Corpus of Spontaneous Japanese (CSJ), and the evaluation set of the CSJ was used for the evaluation.

Note that the CSJ is described in reference document 4 (K. Maekawa, "Corpus of spontaneous Japanese: Its design and evaluation," In Proceedings ISCA and IEEE workshop on spontaneous speech processing and recognition, SSPR 2003), or the like.

In the conventional method in FIG. 8, the WERs are WERs that are obtained when input speech data (A: normal speed), data (B: 0.9×-speed) obtained by multiplying the speech speed of the input speech data by 0.9, and data (C: 1.1×-speed) obtained by multiplying the speech speed of the input speech data by 1.1 are input to the speech recognition apparatus as such. On the other hand, in the proposed method in FIG. 8, the WERs are WERs of data (D: A+B) obtained by generating and integrating the input speech data and the data obtained by multiplying the speech speed of the input speech data by 0.9, WERs of data (E: A+C) obtained by generating and integrating the input speech data and the data obtained by multiplying the speech speed of the input speech data by 1.1, and WERs of data (F: A+B+C) obtained by generating and integrating the input speech data, the data obtained by multiplying the speech speed of the input speech data by 0.9 and the data obtained by multiplying the speech speed of the input speech data by 1.1. From the results of D, E and F in FIG. 8, it is understood that a better recognition performance is obtained in the proposed method.

Second Embodiment

In the speech recognition apparatus according to the first embodiment and the speech recognition apparatus according to the modification of the first embodiment, the data augmentation unit generates augmented speech data by using a preset conversion parameter. On the other hand, a speech recognition apparatus according to a second embodiment determines a conversion parameter in real time, based on input speech data, and generates augmented speech data by using the conversion parameter that is determined in real time.

Figure 9:
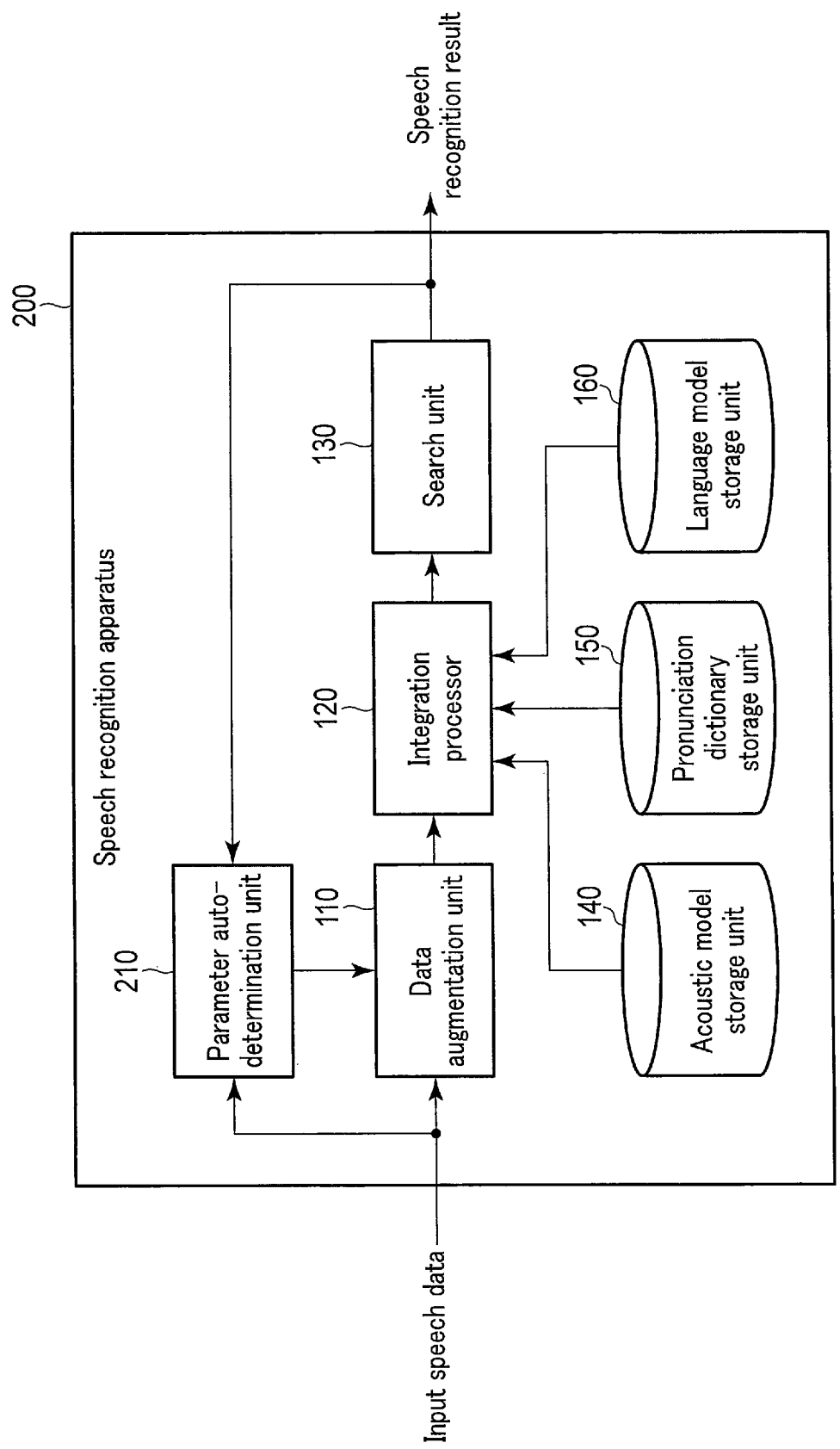
FIG. 9 is a block diagram exemplarily illustrating a configuration of a speech recognition apparatus according to a second embodiment.

FIG. 9 is a block diagram exemplarily illustrating a configuration of a speech recognition apparatus 200 according to the second embodiment. The speech recognition apparatus 200 includes a data augmentation unit 110, an integration processor 120, a search unit 130, an acoustic model storage unit 140, a pronunciation dictionary storage unit 150, a language model storage unit 160, and a parameter auto-determination unit 210.

In the second embodiment, the data augmentation unit 110 receives input speech data from a sound collection device (not shown), and receives a conversion parameter from the parameter auto-determination unit 210. The data augmentation unit 110 generates a plurality of augmented speech data, based on the input speech data and the conversion parameter.

Figure 10:
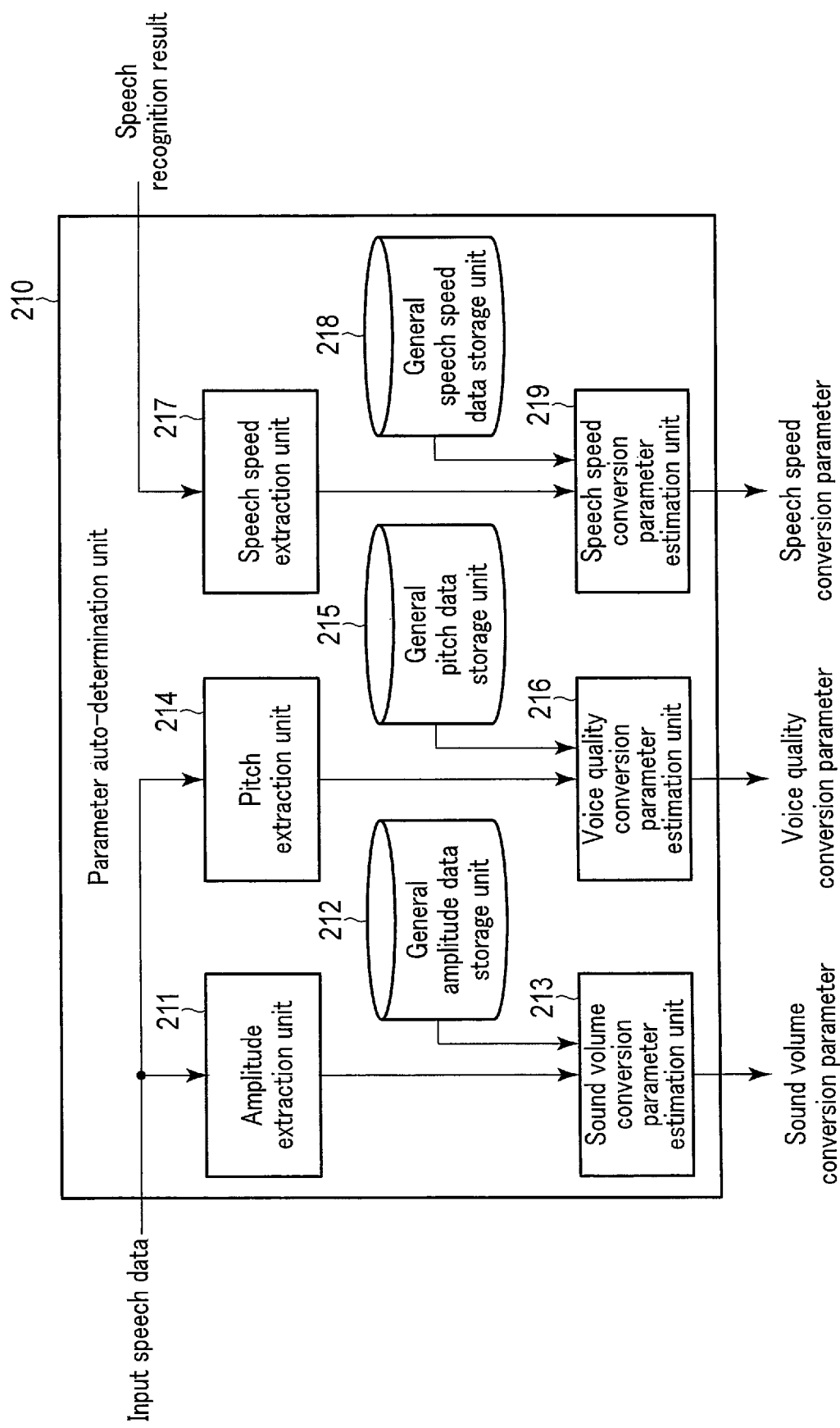
FIG. 10 is a block diagram exemplarily illustrating a configuration of a parameter auto-determination unit of FIG. 9.

FIG. 10 is a block diagram exemplarily illustrating a configuration of the parameter auto-determination unit 210 of FIG. 9. The parameter auto-determination unit 210 includes an amplitude extraction unit 211, a general amplitude data storage unit 212, a sound volume conversion parameter estimation unit 213, a pitch extraction unit 214, a general pitch data storage unit 215, a voice quality conversion parameter estimation unit 216, a speech speed extraction unit 217, a general speech speed data storage unit 218, and a speech speed conversion parameter estimation unit 219. Hereinafter, to begin with, the general amplitude data storage unit 212, general pitch data storage unit 215, and general speech speed data storage unit 218 will be described.

Note that the general amplitude data storage unit 212, general pitch data storage unit 215 and general speech speed data storage unit 218 may be integrated in one or more storage units, or may be provided outside the speech recognition apparatus 200 individually or in an integrated manner.

The general amplitude data storage unit 212 stores general amplitude data. As the general amplitude data, use is made of, for example, a mean of power spectra obtained by subjecting respective general speech data to short-time Fourier transform. As the general speech data, for example, use can be made of speech data that is used in the training of the acoustic model.

The general pitch data storage unit 215 stores general pitch data. As the general pitch data, use is made of, for example, a pitch mean for each speech from each general speech data. The pitch mean can be acquired, for example, by acquiring pitch information for each time frame and then averaging the pitches of the time frames.

Note that, for the acquisition of the pitch mean, use can be made of, for example, a method described in reference document 5 (M. Lahat, R. Niederjohn and D. Krubsack, "A spectral autocorrelation method for measurement of the fundamental frequency of noise-corrupted speech," in IEEE Transactions on Acoustics, Speech, and Signal Processing, vol. 35, no. 6, pp. 741-750, June 1987, doi: 10.1109/TASSP.1987.1165224.), or the like.

The general speech speed data storage unit 218 stores general speech speed data. As the general speech speed data, use is made of, for example, the number of morae per unit time (e.g. per five seconds) of each of general speech data. The mora is a basic unit in the rhythm of the Japanese language. The number of morae per unit time can be acquired from, for example, information of the length and label (transcription) of the general speech data.

The amplitude extraction unit 211 receives the input speech data from the sound collection device. The amplitude extraction unit 211 extracts the amplitude of the input speech data. Specifically, the amplitude extraction unit 211 extracts the amplitude, for example, by averaging power spectra obtained by subjecting the input speech data to short-time Fourier transform. The amplitude extraction unit 211 outputs information (amplitude information) of the extracted amplitude to the sound volume conversion parameter estimation unit 213.

The sound volume conversion parameter estimation unit 213 receives the amplitude information from the amplitude extraction unit 211, and receives general amplitude data from the general amplitude data storage unit 212. The sound volume conversion parameter estimation unit 213 estimates a sound volume conversion parameter, based on the amplitude information and the general amplitude data. The sound volume conversion parameter estimation unit 213 outputs the estimated sound volume conversion parameter to the data augmentation unit 110.

The pitch extraction unit 214 receives the input speech data from the sound collection device. The pitch extraction unit 214 extracts a pitch of the input speech data. Specifically, the pitch extraction unit 214 extracts the pitch by acquiring a pitch mean of each speech from the input speech data. The pitch extraction unit 214 outputs information (pitch information) of the extracted pitch to the voice quality conversion parameter estimation unit 216.

The voice quality conversion parameter estimation unit 216 receives the pitch information from the pitch extraction unit 214, and receives general pitch data from the general pitch data storage unit 215. The voice quality conversion parameter estimation unit 216 estimates a voice quality conversion parameter, based on the pitch information and the general pitch data. The voice quality conversion parameter estimation unit 216 outputs the estimated voice quality conversion parameter to the data augmentation unit 110.

The speech speed extraction unit 217 receives the speech recognition result generated by the speech recognition apparatus 200. The speech speed extraction unit 217 extracts a speech speed of the speech recognition result. Specifically, the speech speed extraction unit 217 extracts the speech speed by acquiring the number of morae per unit time from the length of the input speech data corresponding to the speech recognition result, and from the speech recognition result. The speech recognition result may be correlated with the length of the corresponding input speech data. The speech speed extraction unit 217 outputs information (speech speed information) of the extracted speech speed to the speech speed conversion parameter estimation unit 219. Note that the speech speed extraction unit 217 may receive the input speech data corresponding to the speech recognition result.

The speech speed conversion parameter estimation unit 219 receives the speech speed information from the speech speed extraction unit 217, and receives general speech speed data from the general speech speed data storage unit 218. The speech speed conversion parameter estimation unit 219 estimates a speech speed conversion parameter, based on the speech speed information and the general speech speed data. The speech speed conversion parameter estimation unit 219 outputs the estimated speech speed conversion parameter to the data augmentation unit 110.

The configuration of the speech recognition apparatus 200 according to the second embodiment has been described above. Next, an operation of the speech recognition apparatus 200 will be described with reference to a flowchart of FIG. 11.

FIG. 11 is a flowchart exemplarily illustrating an operation of the speech recognition apparatus 200 of FIG. 9. The flowchart of FIG. 11 illustrates, for example, a flow of sequential steps of outputting a speech recognition result from a lattice corresponding, to one sentence of input speech data.

(Step ST210)

The speech recognition apparatus 200 acquires the input speech data from the sound collection device. Note that, after the completion of the process of the flowchart of FIG. 11, the speech recognition apparatus 200 may further acquire (or store) the speech recognition result that is output, in order to use the speech recognition result in a parameter auto-estimation process to be described later.

(Step ST220)

After the input speech data is acquired, the parameter auto-determination unit 210 estimates a conversion parameter relating to the generation of the augmented speech data. In other words, the parameter auto-determination unit 210 auto-determines the conversion parameter relating to the conversion process, based on the input speech data. Hereinafter, the process of step ST220 is referred to as "parameter auto-estimation process". A concrete example of the parameter auto-estimation process will be described with reference to a flowchart of FIG. 12.

Figure 12:
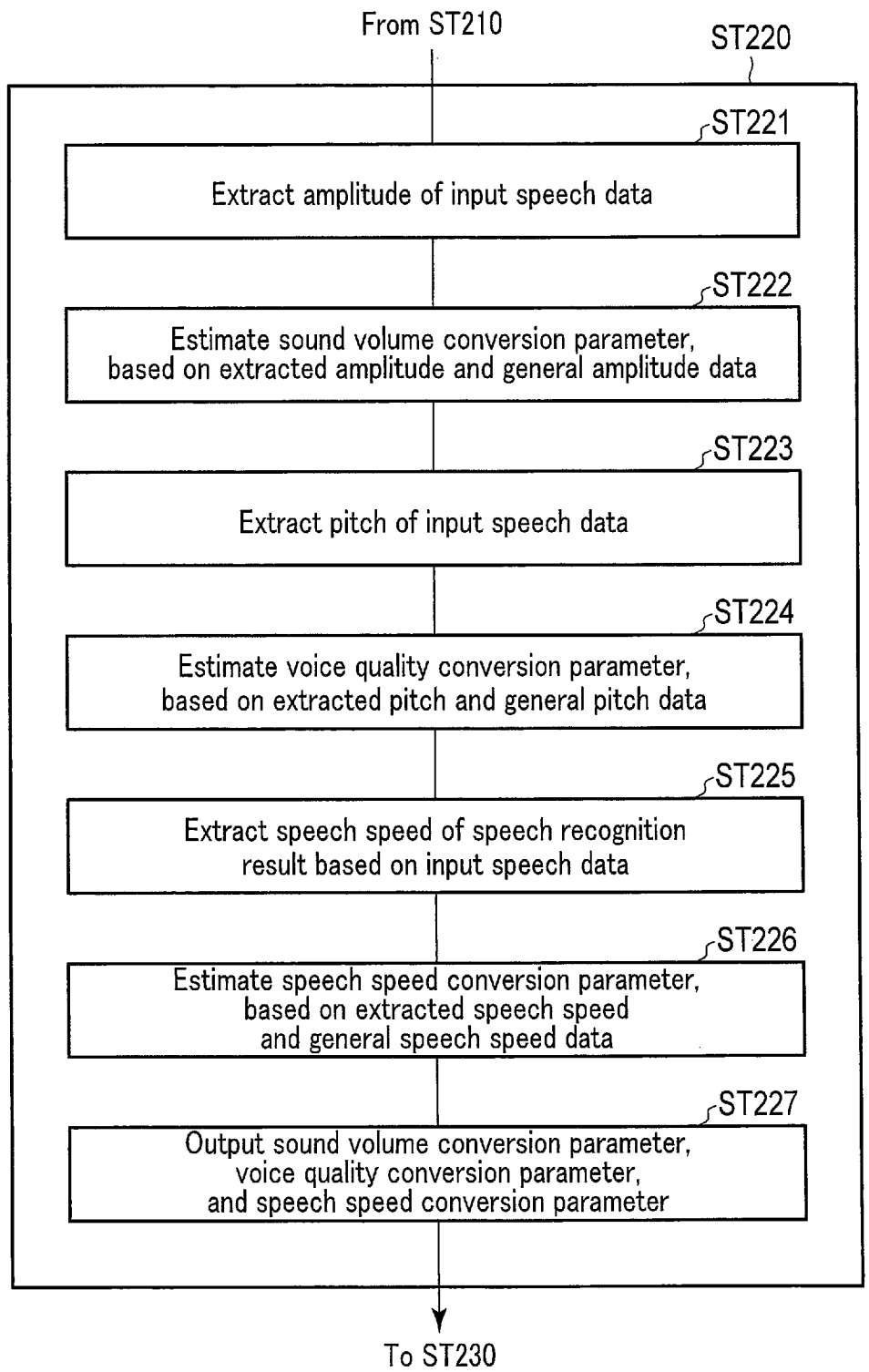
FIG. 12 is a flowchart exemplarily illustrating a parameter auto-estimation process of the flowchart of FIG. 9.

FIG. 12 is a flowchart exemplarily illustrating the parameter auto-estimation process in the flowchart of FIG. 11. The flowchart of FIG. 12 transitions from step ST220. Note that, hereinafter, it is assumed that the speech recognition apparatus 200 outputs one or more speech recognition results.

(Step ST221)

After the acquisition of the input speech data, the amplitude extraction unit 211 extracts the amplitude of the input speech data.

(Step ST222)

After the amplitude is extracted, the sound volume conversion parameter estimation unit 213 estimates the sound volume conversion parameter, based on the extracted amplitude and the general amplitude data. Hereinafter, a concrete example of the process of the sound volume conversion parameter estimation unit 213 will be described.

The estimation of the sound volume conversion parameter can be executed at a time point when the input speech data is acquired. The sound volume conversion parameter estimation unit 213 estimates a sound volume conversion parameter b by using equation (6) below, wherein P is an amplitude (a mean of power spectra) of the input speech data, which is the information of the extracted amplitude, and P' is a mean of the general amplitude data.

$$b=(P'/P)^{1/2} \quad (6)$$

(Step ST223)

After the sound volume conversion parameter is estimated, the pitch extraction unit 214 extracts the pitch of the input speech data.

(Step ST224)

After the pitch is extracted, the voice quality conversion parameter estimation unit 216 estimates the voice quality conversion parameter, based on the extracted pitch and the general pitch data. Hereinafter, a concrete example of the process of the voice quality conversion parameter estimation unit 216 will be described.

The estimation of the voice quality conversion parameter can be executed at a time point when the input speech data is acquired. The voice quality conversion parameter estimation unit 216 estimates a voice quality conversion parameter c by using equation (7) below, wherein F is a pitch mean of the input speech data, which is the information of the extracted pitch, and F' is a mean of the general pitch data.

$$c=F'/F \quad (7)$$

(Step ST225)

After the voice quality conversion parameter is estimated, the speech speed extraction unit 217 extracts a speech speed of the speech recognition result that is based on the input speech data.

(Step ST226)

After the speech speed is extracted, the speech speed conversion parameter estimation unit 219 estimates the speech speed conversion parameter, based on the extracted speech speed and the general speech speed data. Hereinafter, a concrete example of the process of the speech speed conversion parameter estimation unit 219 will be described.

The estimation of the speech speed conversion parameter can be executed only after the speech recognition process is executed on at least one speech. The speech speed conversion parameter estimation unit 219 estimates a speech speed conversion parameter a by using equation (8) below, wherein M is the number of morae per unit time of the input speech data, which is the information of the extracted speech speed, and M' is a mean of the general speech speed data.

$$a=M'/M \quad (8)$$

(Step ST227)

After estimating the sound volume conversion parameter, voice quality conversion parameter and speech speed conversion parameter, the parameter auto-determination unit 210 outputs the sound volume conversion parameter, voice quality conversion parameter and speech speed conversion parameter. After the process of step ST227, the process transitions to step ST230.

Note that the above-described process of step ST221 and step ST222, the process of step ST223 and step ST224, and the process of step ST225 and step ST226 may change their order, or may be executed at the same time.

(Step ST230)

After the conversion parameters are estimated, the data augmentation unit 110 generates a plurality of augmented speech data, based on the input speech data and the conversion parameters.

Note that the process of step ST240 to step ST260 is substantially the same as the process of step ST130 to step ST150 of FIG. 3, and thus a description thereof is omitted.

As described above, the speech recognition apparatus according to the second embodiment can estimate the conversion parameters in real time in accordance with the input speech data, and can apply the conversion parameters to the generation of the augmented speech data. Thereby, the speech recognition apparatus according to the second embodiment can generate augmented speech data which are close to the environment of the training data set of the acoustic model, and can therefore improve the speech recognition performance.

Third Embodiment

The speech recognition apparatus according to the first embodiment and the speech recognition apparatus according to the modification of the first embodiment output the speech recognition result by executing the speech recognition process on the input speech data. On the other hand, a speech recognition apparatus according to a third embodiment further adapts the input speech data and the speech recognition result, which corresponds to the input speech data, to the acoustic model, and generates an adapted acoustic model.

Figure 13:
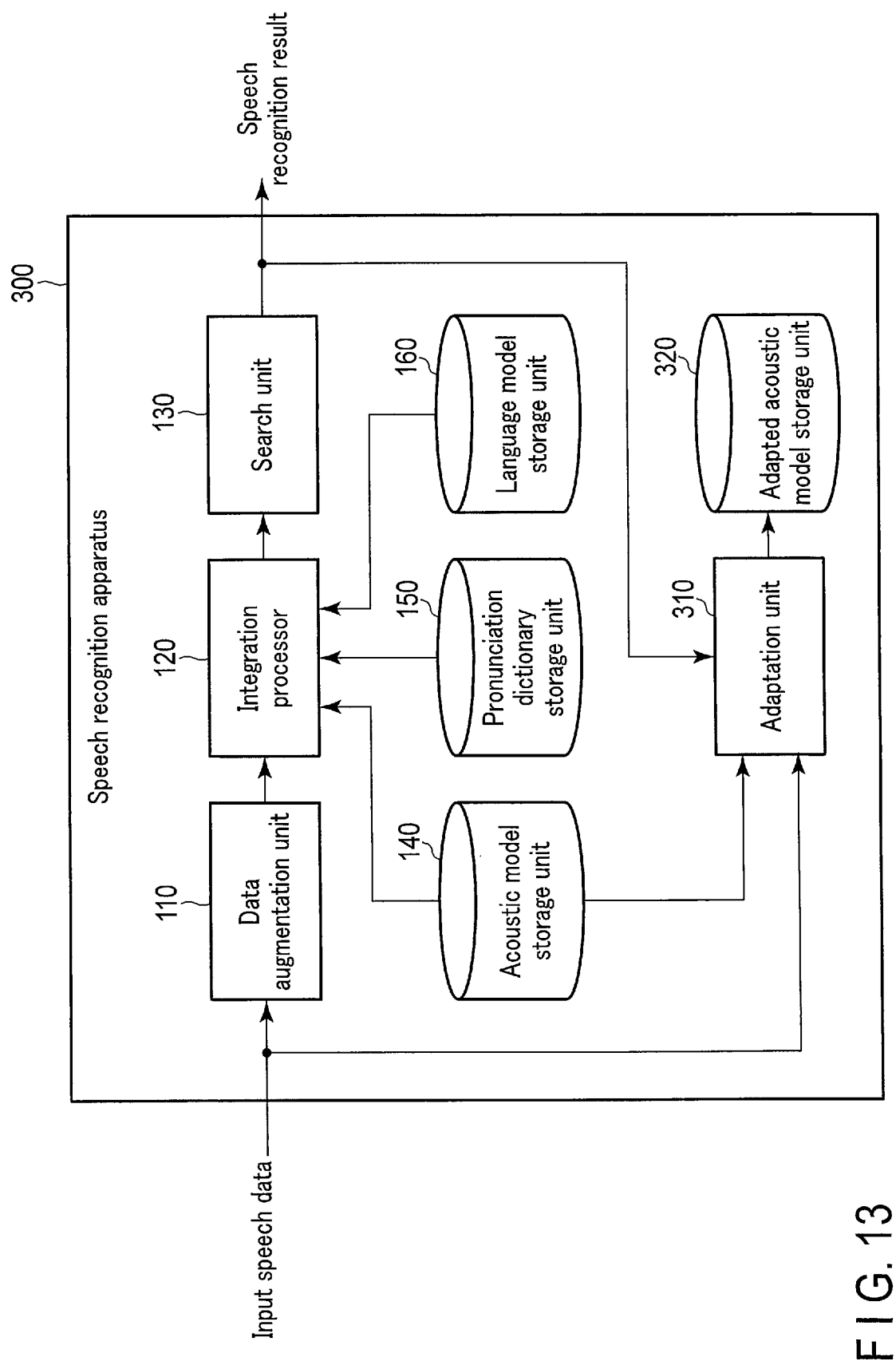
FIG. 13 is a block diagram exemplarily illustrating a configuration of a speech recognition apparatus according to a third embodiment.

FIG. 13 is a block diagram exemplarily illustrating a configuration of a speech recognition apparatus 300 according to the third embodiment. The speech recognition apparatus 300 includes a data augmentation unit 110, an integration processor 120, a search unit 130, an acoustic model storage unit 140, a pronunciation dictionary storage unit 150, a language model storage unit 160, an adaptation unit 310, and an adapted acoustic model storage unit 320. Note that the acoustic model storage unit 140, pronunciation dictionary storage unit 150, language model storage unit 160, adaptation unit 310, and adapted acoustic model storage unit 320 may be integrated in one or more storage units, or may be provided outside the speech recognition apparatus 300 individually or in an integrated manner.

The adaptation unit 310 receives the input speech data from the sound collection device (not shown), receives the acoustic model from the acoustic model storage unit 140, and receives the speech recognition result from the search unit 130. The adaptation unit 310 generates an adapted acoustic model in which the acoustic model is adapted to a speaker of the input speech data, based on the input speech data and the speech recognition result corresponding to the input speech data. The adaptation unit 310 outputs the generated adapted acoustic model to the adapted acoustic model storage unit 320.

Specifically, the adaptation unit 310 adapts the acoustic model by using adaptation data in which the speech recognition result is used as a correct answer label, and the input speech data and the correct answer label are combined as a set. The adaptation of the acoustic model is executed, for example, by optimizing the parameters of the acoustic model by using the adaptation data. To be more specific, when a DNN is used in the acoustic model, the adaptation unit 310 executes optimization by using, as initial values, the parameters of the acoustic model stored in the acoustic model storage unit 140. As the method of the optimization, use can be made of, for example, a method described in reference document 6 (P. J. Werbos, "Backpropagation Through Time: What It Does and How to Do It," Proceedings of the IEEE, vol. 78, no. 10, 1990.), or the like.

The adapted acoustic model storage unit 320 receives the adapted acoustic model from the adaptation unit 310. The adapted acoustic model storage unit 320 stores the adapted acoustic model. After a predetermined condition is satisfied, the adapted acoustic model storage unit 320 outputs the adapted acoustic model to the integration processor 120. The predetermined condition is, for example, an elapsed time from the start of the speech recognition by the speech recognition apparatus 300.

A concrete applied example of the adaptation unit 310 and the adapted acoustic model storage unit 320 will be described. If the user activates the speech recognition apparatus 300, the speech recognition apparatus 300 executes the speech recognition process by using the acoustic model (hereinafter referred to as "initial acoustic model") stored in the acoustic model storage unit 140 during an initial predetermined time (for example, at least 20 minutes to about 30 minutes). At the same time as this process, the adaptation unit 310 trains the acoustic model on the background, based on the speech recognition result and the input speech data, and outputs the adapted acoustic model to the adapted acoustic model storage unit 320. Then, after the predetermined time has passed, the speech recognition apparatus 300 executes the speech recognition process by switching the initial acoustic model to the adapted acoustic model.

Note that the speech recognition apparatus 300 may include a function of prompting the user to make selection as to whether or not to switch the acoustic model, after the passage of a predetermined time, and may prompt the user to make the selection. In addition, the speech recognition apparatus 300 may include a function of automatically judging and determining whether or not to switch the acoustic model, by comparing a confidence level of the speech recognition result by the initial acoustic model and a confidence level of the speech recognition result by the adapted acoustic model. For the calculation of the confidence level, use can be made of a method described in reference document 7 (A. Lee, et. al., "Real-time word confidence scoring using local posterior probabilities on tree trellis search," ICASSP 2004) and reference document 8 (A. Kastanos, et al., "Confidence Estimation for Black Box Automatic Speech Recognition Systems Using Lattice Recurrent Neural Networks," ICASSP 2020), or the like.

As described above, the speech recognition apparatus according to the third embodiment can generate the adapted acoustic model in which the acoustic model is adapted to the speaker of the input speech data, based on the input speech data and the speech recognition result. Thereby, the speech recognition apparatus according to the third embodiment can generate the acoustic model adapted to the input speech data, and can therefore improve the speech recognition performance.

Fourth Embodiment

The speech recognition apparatus according to the second embodiment is constituted by adding the parameter auto-determination unit to the speech recognition apparatus according to the first embodiment (or the speech recognition apparatus according to the modification of the first embodiment). On the other hand, the speech recognition apparatus according to the third embodiment is constituted by adding the adaptation unit and the adapted acoustic model storage unit to the speech recognition apparatus according to the first embodiment (or the speech recognition apparatus according to the modification of the first embodiment). A speech recognition apparatus according to a fourth embodiment includes all of these components.

FIG. 14 is a block diagram exemplarily illustrating a configuration of a speech recognition apparatus 400 according to the fourth embodiment. The speech recognition apparatus 400 includes a data augmentation unit 110, an integration processor 120, a search unit 130, an acoustic model storage unit 140, a pronunciation dictionary storage unit 150, a language model storage unit 160, a parameter auto-determination unit 410, an adaptation unit 420, and an adapted acoustic model storage unit 430.

The parameter auto-determination unit 410 is substantially the same as the parameter auto-determination unit 210 of FIG. 9, the adaptation unit 420 is substantially the same as the adaptation unit 310 of FIG. 13, and the adapted acoustic model storage unit 430 is substantially the same as the adapted acoustic model storage unit 320 of FIG. 13.

As described above, the speech recognition apparatus according to the fourth embodiment can be expected to have the same advantageous effects as the speech recognition apparatuses of the above-described embodiments.

FIG. 15 is a block diagram exemplarily illustrating a hardware configuration of a computer according to an embodiment. A computer 500 includes, as hardware, a CPU (Central Processing Unit) 510, a RAM (Random Access Memory) 520, a program memory 530, an auxiliary storage device 540, and an input/output interface 550. The CPU 510 communicates, via a bus 560, with the RAM 520, program memory 530, auxiliary storage device 540, and input/output interface 550.

The CPU 510 is an example of a general processor. The RAM 520 is used by the CPU 510 as a working memory. The RAM 520 includes a volatile memory such as an SDRAM (Synchronous Dynamic Random Access Memory). The program memory 530 stores various programs including a speech recognition process program. As the program memory 530, use is made of, for example, a ROM (Read-Only Memory), a part of the auxiliary storage device 540, or a combination thereof. The auxiliary storage device 540 nontemporarily stores data. The auxiliary storage device 540 includes a nonvolatile memory such as an HDD or an SSD.

The input/output interface 550 is an interface for a connection to another device. The input/output interface 550 is used, for example, for a connection to the sound collection device and the output device.

Each of the programs stored in the program memory 530 includes computer-executable instructions. When the program (computer-executable instructions) is executed by the CPU 510, the program causes the CPU 510 to execute a predetermined process. For example, when the speech recognition process program or the like is executed by the CPU 510, the speech recognition process program or the like causes the CPU 510 to execute a series of processes described in the respective parts of FIGS. 1, 2, 6, 9, 10, 13 and 14.

The program may be provided to the computer 500 in the state in which the program is stored in a computer-readable storage medium. In this case, the computer 500 further includes a drive (not shown) that reads data from the storage medium, and acquires the program from the storage medium. Examples of the storage medium include a magnetic disk, an optical disc (CD-ROM, CD-R, DVD-ROM, DVD-R, or the like), a magneto-optical disc (MO, or the like), and a semiconductor memory. In addition, the program may be stored in a server on a communication network, and the computer 500 may download the program from the server by using the input/output interface 550.

The processes described in the embodiments may be executed not only by a general hardware processor such as the CPU 510 executing the programs, but may also be executed by a purpose-specific hardware processor such as an ASIC (Application Specific Integrated Circuit). The term "processing circuit (processing unit)" includes at least one general hardware processor, at least one purpose-specific hardware processor, or a combination of at least one general hardware processor and at least one purpose-specific hardware processor. In the example of FIG. 15, the CPU 510, RAM 520 and program memory 530 correspond to the processing circuit.

Thus, according to each of the above embodiments, the speech recognition performance can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech recognition apparatus comprising processing circuitry configured to:
   generate a plurality of augmented speech data, based on input speech data, the plurality of augmented speech data each corresponding to an entirety of the input speech data,
   wherein at least one of the plurality of augmented speech data is generated by applying a signal processing operation selected from:
     (i) a speech speed conversion in which the input speech data is resampled at a sampling rate different from an original sampling rate and then restored to the original sampling rate using interpolation,
     (ii) a sound volume conversion in which an amplitude of a waveform of the input speech data is multiplied by a gain coefficient, and
     (iii) a voice quality conversion in which a pitch of the input speech data is altered using a Pitch Synchronous Overlap and Add (PSOLA) method;
   generate a plurality of acoustic scores, based on the plurality of augmented speech data and an acoustic model;
   generate a plurality of adjusted acoustic scores by resampling the acoustic scores, wherein the resampling comprises, for each acoustic score sequence of K-dimensional vectors over $T_n$ time frames, resampling each of the K dimensions independently using interpolation at a sampling rate of $T/T_n$, where $T_n$ is a number of time frames of the plurality of augmented speech data, and where T is a number of time frames of the input speech data, thereby converting each acoustic score sequence into a corresponding sequence over T time frames;
   generate an integrated acoustic score by calculating, for each time frame, an average value, median, or maximum value across the adjusted acoustic scores;
   generate an integrated lattice, based on the integrated acoustic score, a pronunciation dictionary, and a language model;
   search a speech recognition result with a highest likelihood from the integrated lattice;
   estimate a conversion parameter based on the input speech data, wherein the conversion parameter is at least one of (i) a speech speed conversion parameter based on a comparison between a number of morae per unit time and a reference speech speed, (ii) a sound volume conversion parameter based on a power spectrum comparison, and (iii) a voice quality conversion parameter based on a pitch mean comparison; and
   generate at least one of the plurality of augmented speech data by executing a conversion process in which the estimated conversion parameter is uniformly applied to the input speech data using the corresponding signal processing operation.

2. The speech recognition apparatus according to claim 1, wherein the integrated lattice is a word lattice in which candidate words by speech recognition are nodes, and likelihoods of the candidate words are edges.

3. The speech recognition apparatus according to claim 1, wherein the processing circuitry is further configured to auto-determine a conversion parameter relating to the conversion process, based on the input speech data.

4. The speech recognition apparatus according to claim 1, wherein the plurality of augmented speech data include the input speech data.

5. The speech recognition apparatus according to claim 1, wherein the acoustic model is a single model that is trained to output a posterior probability corresponding to an acoustic score by inputting speech data in units of at least one of a phoneme, a syllable, a character, a word-piece, and a word.

6. The speech recognition apparatus according to claim 1, wherein the processing circuitry is further configured to generate an adapted acoustic model in which the acoustic model is adapted to a speaker of the input speech data, based on the input speech data and the speech recognition result corresponding to the input speech data.

7. A speech recognition apparatus comprising processing circuitry configured to:
generate a plurality of augmented speech data, based on input speech data, the plurality of augmented speech data each corresponding to an entirety of the input speech data,
wherein at least one of the plurality of augmented speech data is generated by applying a signal processing operation selected from:
  (i) a speech speed conversion in which the input speech data is resampled at a sampling rate different from an original sampling rate and then restored to the original sampling rate using interpolation,
  (ii) a sound volume conversion in which an amplitude of a waveform of the input speech data is multiplied by a gain coefficient, and
  (iii) a voice quality conversion in which a pitch of the input speech data is altered using a Pitch Synchronous Overlap and Add (PSOLA) method;
generate a plurality of acoustic scores, based on the plurality of augmented speech data and an acoustic model;
generate a plurality of adjusted acoustic scores by resampling the acoustic scores, wherein the resampling comprises, for each acoustic score sequence of K-dimensional vectors over $T_n$ time frames, resampling each of the K dimensions independently using interpolation at a sampling rate of $T/T_n$, where $T_n$ is a number of time frames of the plurality of augmented speech data, and where T is a number of time frames of the input speech data, thereby converting each acoustic score sequence into a corresponding sequence over T time frames;
generate a plurality of lattices, based on the acoustic scores, a pronunciation dictionary, and a language model;
generate an integrated lattice by integrating the lattices;
search a speech recognition result with a highest likelihood from the integrated lattice;
estimate a conversion parameter based on the input speech data, wherein the conversion parameter is at least one of (i) a speech speed conversion parameter based on a comparison between a number of morae per unit time and a reference speech speed, (ii) a sound volume conversion parameter based on a power spectrum comparison, and (iii) a voice quality conversion parameter based on a pitch mean comparison; and
generate at least one of the plurality of augmented speech data by executing a conversion process in which the estimated conversion parameter is uniformly applied to the input speech data using the corresponding signal processing operation.

8. The speech recognition apparatus according to claim 7, wherein each of the lattices is a word lattice in which candidate words by speech recognition are nodes, and likelihoods of the candidate words are edges.

9. The speech recognition apparatus according to claim 8, wherein the processing circuitry is further configured to generate the integrated lattice by connecting start points of the lattices and connecting end points of the lattices, and integrating common parts of the candidate words.

10. The speech recognition apparatus according to claim 7, wherein the processing circuitry is further configured to auto-determine a conversion parameter relating to the conversion process, based on the input speech data.

11. The speech recognition apparatus according to claim 7, wherein the processing circuitry is further configured to generate an adapted acoustic model in which the acoustic model is adapted to a speaker of the input speech data, based on the input speech data and the speech recognition result corresponding to the input speech data.

12. A speech recognition method comprising:
generating a plurality of augmented speech data, based on input speech data, the plurality of augmented speech data each corresponding to an entirety of the input speech data,
wherein at least one of the plurality of augmented speech data is generated by applying a signal processing operation selected from:
  (i) a speech speed conversion in which the input speech data is resampled at a sampling rate different from an original sampling rate and then restored to the original sampling rate using interpolation,
  (ii) a sound volume conversion in which an amplitude of a waveform of the input speech data is multiplied by a gain coefficient, and
  (iii) a voice quality conversion in which a pitch of the input speech data is altered using a Pitch Synchronous Overlap and Add (PSOLA) method;
generating a plurality of acoustic scores, based on the plurality of augmented speech data and an acoustic model;
generating a plurality of adjusted acoustic scores by resampling the acoustic scores, wherein the resampling comprises, for each acoustic score sequence of K-dimensional vectors over $T_n$ time frames, resampling each of the K dimensions independently using interpolation at a sampling rate of $T/T_n$, where $T_n$ is a number of time frames of the plurality of augmented speech data, and where T is a number of time frames of the input speech data, thereby converting each acoustic score sequence into a corresponding sequence over T time frames;
generating an integrated acoustic score by calculating, for each time frame, an average value, median, or maximum value across the adjusted acoustic scores;
generating an integrated lattice, based on the integrated acoustic score, a pronunciation dictionary, and a language model; and
searching a speech recognition result with a highest likelihood from the integrated lattice;
estimating a conversion parameter based on the input speech data, wherein the conversion parameter is at least one of (i) a speech speed conversion parameter based on a comparison between a number of morae per unit time and a reference speech speed, (ii) a sound volume conversion parameter based on a power spectrum comparison, and (iii) a voice quality conversion parameter based on a pitch mean comparison; and generating at least one of the plurality of augmented speech data by executing a conversion process in which the estimated conversion parameter is uniformly applied to the input speech data using the corresponding signal processing operation.

* * * * *